United States Patent
Zhu et al.

(10) Patent No.: US 10,444,918 B2
(45) Date of Patent: Oct. 15, 2019

(54) BACK OF COVER TOUCH SENSORS

(71) Applicant: Apple Inc., Cupertino, CA (US)

(72) Inventors: Wencong Zhu, Santa Clara, CA (US); Albert Lin, Cupertino, CA (US); Alexander A. Penn, Cupertino, CA (US); Ashray Vinayak Gogte, Cupertino, CA (US); Chun-Hao Tung, San Jose, CA (US); Hao Zhang, Sunnyvale, CA (US); Hui Zhou, Cupertino, CA (US); John Z. Zhong, Saratoga, CA (US); Steven P. Hotelling, Los Gatos, CA (US); Sudip Mondal, Bangalore KA (IN); Sumant Ranganathan, Saratoga, CA (US); Sunggu Kang, San Jose, CA (US); Ramachandran Chundru, Cupertino, CA (US); Viswa B. Pilla, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 126 days.

(21) Appl. No.: 15/691,283

(22) Filed: Aug. 30, 2017

(65) Prior Publication Data

US 2018/0067584 A1 Mar. 8, 2018

Related U.S. Application Data

(60) Provisional application No. 62/384,129, filed on Sep. 6, 2016.

(51) Int. Cl.
*G06F 3/044* (2006.01)

(52) U.S. Cl.
CPC .... *G06F 3/044* (2013.01); *G06F 2203/04103* (2013.01); *G06F 2203/04107* (2013.01)

(58) Field of Classification Search
CPC combination set(s) only.
See application file for complete search history.

(56) References Cited

U.S. PATENT DOCUMENTS

| | | | |
|---|---|---|---|
| 4,087,625 | A | 5/1978 | Dym et al. |
| 4,090,092 | A | 5/1978 | Serrano |

(Continued)

FOREIGN PATENT DOCUMENTS

| | | | |
|---|---|---|---|
| CN | 1246638 | A | 3/2000 |
| CN | 1527274 | A | 9/2004 |

(Continued)

OTHER PUBLICATIONS

Non-Final Office Action dated Apr. 3, 2018, for U.S. Appl. No. 14/318,157, filed Jun. 27, 2014, twelve pages.

(Continued)

*Primary Examiner* — Van N Chow
(74) *Attorney, Agent, or Firm* — Kubota & Basol LLP

(57) ABSTRACT

Touch sensor configurations for reducing electrostatic discharge events in the border area of a touch sensor panel is disclosed. Touch sensors (e.g., electrodes formed on the cover material and/or the opaque mask) can be susceptible to certain events such as arcing and discharge/joule heating, which may negatively affect touch sensor performance. Examples of the disclosure can include increasing the trace width, spacing, and/or thickness in the border area relative to the trace width, spacing, and/or thickness in the visible/active area along one or more sides of the touch sensor panel. In some examples, touch electrodes can be located exclusively in the visible/active areas along one or more sides of the touch sensor panel, while dummy sections can be included in both the border and visible/active areas.

(Continued)

Additionally or alternatively, one or more gaps between adjacent touch electrodes in the border area or serpentine routing can be included.

10 Claims, 16 Drawing Sheets

(56)  References Cited

U.S. PATENT DOCUMENTS

| | | | |
|---|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 * | 5/2001 | Nohno ............... G06F 3/0412 178/18.03 |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 | 3/2009 | Sequine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,537,126 B2 | 9/2013 | Yousefpor et al. |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,884,917 B2 | 11/2014 | Seo |
| 8,902,172 B2 | 12/2014 | Peng |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo et al. |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,292,137 B2 | 3/2016 | Kogo |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,690,397 B2 | 6/2017 | Shepelev et al. |
| 9,874,975 B2 | 1/2018 | Benbasat et al. |
| 9,880,655 B2 | 1/2018 | O'Connor |
| 9,886,141 B2 * | 2/2018 | Yousefpor ............... G06F 3/044 |
| 9,996,175 B2 | 6/2018 | Hotelling et al. |
| 10,001,888 B2 | 6/2018 | Hong et al. |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |

(56) References Cited

U.S. PATENT DOCUMENTS

| | | |
|---|---|---|
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0007533 A1* | 1/2008 | Hotelling .............. G06F 3/044 345/173 |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0054107 A1 | 2/2009 | Feland et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0149108 A1 | 6/2010 | Hotelling |
| 2010/0156846 A1 | 6/2010 | Long et al. |
| 2010/0182278 A1 | 7/2010 | Li et al. |
| 2010/0194697 A1 | 8/2010 | Hotelling et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328248 A1 | 12/2010 | Mozdzyn |
| 2010/0328263 A1 | 12/2010 | Lin |
| 2011/0007020 A1 | 1/2011 | Hong |
| 2011/0025623 A1 | 2/2011 | Lin |
| 2011/0025629 A1 | 2/2011 | Grivna et al. |
| 2011/0025635 A1 | 2/2011 | Lee |
| 2011/0096016 A1 | 4/2011 | Yilmaz |
| 2011/0134050 A1 | 6/2011 | Harley |
| 2011/0157068 A1 | 6/2011 | Parker |
| 2011/0175846 A1 | 7/2011 | Wang et al. |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin |
| 2012/0050216 A1 | 3/2012 | Kremin et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang |
| 2012/0146942 A1 | 6/2012 | Kamoshida et al. |
| 2012/0154324 A1 | 6/2012 | Wright et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang |
| 2013/0057511 A1 | 3/2013 | Shepelev et al. |
| 2013/0069911 A1 | 3/2013 | You |
| 2013/0076648 A1 | 3/2013 | Krah et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |

(56) References Cited

U.S. PATENT DOCUMENTS

| | | |
|---|---|---|
| 2013/0176271 A1 | 7/2013 | Sobel et al. |
| 2013/0176273 A1 | 7/2013 | Li et al. |
| 2013/0215049 A1 | 8/2013 | Lee |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0271427 A1 | 10/2013 | Benbasat |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0307821 A1 | 11/2013 | Kogo |
| 2013/0314342 A1 | 11/2013 | Kim |
| 2013/0320994 A1* | 12/2013 | Brittain ............ G06F 3/0416 324/537 |
| 2013/0321289 A1 | 12/2013 | Dubery et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022201 A1 | 1/2014 | Boychuk |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1 | 4/2014 | Chen et al. |
| 2014/0118270 A1 | 5/2014 | Moses |
| 2014/0125628 A1 | 5/2014 | Yoshida et al. |
| 2014/0132560 A1 | 5/2014 | Huang et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0204058 A1 | 7/2014 | Huang et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0306924 A1 | 10/2014 | Lin |
| 2014/0347574 A1 | 11/2014 | Tung et al. |
| 2014/0036843 A1 | 12/2014 | Abzarian et al. |
| 2014/0362034 A1 | 12/2014 | Mo et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0015528 A1 | 1/2015 | Vandermeijden |
| 2015/0026398 A1 | 1/2015 | Kim |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |
| 2016/0041629 A1 | 2/2016 | Rao |
| 2016/0048234 A1 | 2/2016 | Chandran et al. |
| 2016/0062533 A1 | 3/2016 | O'Connor |
| 2016/0139728 A1 | 5/2016 | Jeon et al. |
| 2016/0154505 A1 | 6/2016 | Chang |
| 2016/0154529 A1 | 6/2016 | Westerman |
| 2016/0224177 A1 | 8/2016 | Krah |
| 2016/0224189 A1 | 8/2016 | Yousefpor et al. |
| 2016/0246423 A1 | 8/2016 | Fu |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0090619 A1 | 3/2017 | Yousefpor |
| 2017/0097703 A1 | 4/2017 | Lee |
| 2017/0139539 A1 | 5/2017 | Yao et al. |
| 2017/0168626 A1 | 6/2017 | Konicek |
| 2017/0285804 A1 | 10/2017 | Yingxuan et al. |
| 2018/0275824 A1 | 9/2018 | Li et al. |
| 2018/0307374 A1 | 10/2018 | Shah et al. |
| 2018/0307375 A1 | 10/2018 | Shah et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 102023768 A | 4/2011 |
| CN | 103049148 A | 4/2013 |
| CN | 103294321 A | 9/2013 |
| CN | 103809810 A | 5/2014 |
| CN | 104020908 A | 9/2014 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 455 264 A2 | 9/2004 |
| EP | 1 455 264 A3 | 9/2004 |
| EP | 1 573 706 A2 | 9/2005 |
| EP | 1 573 706 A3 | 9/2005 |
| EP | 1 644 918 A2 | 4/2006 |
| EP | 1 717 677 A2 | 11/2006 |
| EP | 1 717 677 A3 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2005-301373 A | 10/2005 |
| JP | 2007-018515 A | 1/2007 |
| JP | 2008-510251 A | 4/2008 |
| JP | 2008-225415 A | 9/2008 |
| KR | 10-20040091728 A | 10/2004 |
| KR | 10-20070002327 A | 1/2007 |
| KR | 10-2008-0019125 A | 3/2008 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442 A1 | 5/2011 |

(56) References Cited

FOREIGN PATENT DOCUMENTS

| | | |
|---|---|---|
| TW | 201401129 A | 1/2014 |
| TW | 201419071 A | 5/2014 |
| WO | WO-99/35633 A2 | 7/1999 |
| WO | WO-99/35633 A3 | 7/1999 |
| WO | WO-01/097204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/020305 A3 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/089766 A3 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2015/017196 A1 | 2/2014 |
| WO | WO-2014/127716 A1 | 8/2014 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2016/144437 A1 | 9/2016 |
| WO | WO-2017/058415 A2 | 4/2017 |

OTHER PUBLICATIONS

Notice of Allowance dated Mar. 1, 2018, for U.S. Appl. No. 14/645,120, filed Mar. 11, 2015, five pages.
Non-Final Office Action dated Sep. 14, 2017, for U.S. Appl. No. 15/017,463, filed Feb. 5, 2016, 22 pages.
Notice of Allowance dated Sep. 20, 2017, for U.S. Appl. No. 14/082,003, filed Nov. 15, 2013, eight pages.
Notice of Allowance dated Sep. 20, 2017, for U.S. Appl. No. 15/144,706, filed May 2, 2016, nine pages.
Notice of Allowance dated Oct. 3, 2017, for U.S. Appl. No. 14/082,003, filed Nov. 15, 2013, nine pages.
Final Office Action dated May 14, 2018, for U.S. Appl. No. 15/006,987, filed Jan. 26, 2016, 11 pages.
Final Office Action dated May 17, 2018, for U.S. Appl. No. 15/017,463, filed Feb. 5, 2016, 22 pages.
Non-Final Office Action dated Dec. 21, 2018, for U.S. Appl. No. 15/313,549, filed Nov. 22, 2016, thirteen pages.
Non-Final Office Action dated Jan. 2, 2019, for U.S. Appl. No. 15/522,737, filed Apr. 27, 2017, thirteen pages.
Non-Final Office Action dated Jan. 18, 2019 , for U.S. Appl. No. 14/993,017, filed Jan. 11, 2016, 34 pages.
Non-Final Office Action dated Jan. 18, 2019 , for U.S. Appl. No. 15/087,956, filed Mar. 31, 2016, twelve pages.
Notice of Allowance dated Dec. 31, 2018, for U.S. Appl. No. 14/318,157, filed Jun. 27, 2014, eight pages.
Notice of Allowance dated Oct. 13, 2017, for U.S. Appl. No. 14/558,529, filed Dec. 2, 2014, eight pages.
Final Office Action dated Aug. 16, 2018, for U.S. Appl. No. 14/993,017, filed Jan. 11, 2016, 35 pages.
European Search Report dated Jan. 31, 2018, for EP Application No. 17183937.6, four pages.
Non-Final Office Action dated Jan. 22, 2018 , for U.S. Appl. No. 15/097,179, filed Apr. 12, 2016, 11 pages.
Notice of Allowance dated Feb. 9, 2018, for U.S. Appl. No. 14/550,686, filed Nov. 21, 2014, 11 pages.
Final Office Action dated Dec. 5, 2017, for U.S. Appl. No. 15/006,987, filed Jan. 26, 2016, 16 pages.
Non-Final Office Action dated Dec. 22, 2017 , for U.S. Appl. No. 14/993,017, filed Jan. 11, 2016, 23 pages.
Final Office Action dated Jul. 27, 2018, for U.S. Appl. No. 15/097,179, filed Apr. 12, 2016, 11 pages.
Non-Final Office Action dated Jun. 20, 2018, for U.S. Appl. No. 15/009,774, filed Jan. 28, 2016, 17 pages.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.
Chinese Search Report dated Jan. 7, 2011, for CN Application No. 2009200081997, filed Apr. 24, 2009, with English Translation, 14 pages.
Chinese Search Report dated Jan. 10, 2011, for CN Application No. 2008201338142, filed Sep. 27, 2008, with English Translation, 25 pages.
Chinese Search Report completed Jun. 3, 2011, for CN Patent Application No. ZL2009201524013, with English Translation, 20 pages.
Chinese Search Report completed Dec. 14, 2011, for CN Patent Application No. ZL201020108330X, filed Feb. 2, 2010, with English Translation, 12 pages.
Chinese Search Report completed May 18, 2015, for CN Patent Application No. 201310042816.6, filed Feb. 2, 2010, two pages.
European Search Report dated Mar. 19, 2009, for EP Application No. 08017396.6, filed Oct. 8, 2008, seven pages.
European Search Report dated Jul. 21, 2010, for EP Patent Application 10151969.2, six pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
European Search Report dated Jul. 27, 2017, for EP Application No. 14902458.0, four pages.
Final Office Action dated Jun. 8, 2011, for U.S. Appl. No. 12/038,760, filed Feb. 27, 2008, 20 pages.
Final Office Action dated Dec. 15, 2011, for U.S. Appl. No. 12/333,250, filed Dec. 11, 2008, 12 pages.
Final Office Action dated Jan. 5, 2012, for U.S. Appl. No. 12/206,680, filed Sep. 8, 2008, 15 pages.
Final Office Action dated Jan. 19, 2012, for U.S. Appl. No. 12/110,024, filed Apr. 25, 2008, 12 pages.
Final Office Action dated Aug. 31, 2012, for U.S. Appl. No. 12/110,075, filed Apr. 25, 2008, 15 pages.
Final Office Action dated Dec. 24, 2012, for U.S. Appl. No. 12/110,024, filed Apr. 25, 2008, 21 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.

(56) References Cited

OTHER PUBLICATIONS

Final Office Action dated May 22, 2013, for U.S. Appl. No. 12/206,680, filed Sep. 8, 2008, 16 pages.
Final Office Action dated Jun. 21, 2013, for U.S. Appl. No. 12/545,754, filed Aug. 21, 2009, 6 pages.
Final Office Action dated Jul. 19, 2013, for U.S. Appl. No. 12,545/604, filed Aug. 21, 2009, 17 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987 filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182 filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182 filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
Final Office Action dated Sep. 29, 2016, for U.S. Appl. No. 14/558,529, filed Dec. 2, 2014, 22 pages.
Final Office Action dated Nov. 4, 2016, for U.S. Appl. No. 14/082,003, filed Nov. 15, 2013, 18 pages.
Final Office Action dated Jul. 26, 2017, for U.S. Appl. No. 14/318,157, filed Jun. 27, 2014, 10 pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
Great Britain Search Report dated Jan. 19, 2009, for GB Application No. GB0817242.1, filed Sep. 22, 2008, two pages.
Great Britain Search Report dated Jan. 19, 2010, for GB Application No. GB0817242.1, filed Sep. 22, 2008, two pages.
International Search Report dated Mar. 19, 2009, for PCT Application No. PCT/US2008/078836, filed on Oct. 3, 2008, four pages.
International Search Report dated Jul. 17, 2009, for PCT Application No. PCT/US2009/041460, three pages.
International Search Report dated Aug. 5, 2009, for PCT Application No. PCT/US2009/041465, filed Apr. 22, 2009, four pages.
International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, 4 pages.
International Search Report dated May 2, 2011, for PCT Application No. PCT/US2010/058988, filed Dec. 3, 2010, five pages.
International Search Report dated Aug. 6, 2013, for PCT Application No. PCT/US2013/036662, filed Apr. 15, 2013, three pages.
International Search Report dated Sep. 24, 2104, for PCT Application No. PCT/US/2014/39245, eleven pages.
International Search Report dated Dec. 12, 2014, for PCT Application No. PCT/US2014/56795, two pages.
International Search Report dated Jan. 29, 2015, for PCT Application No. PCT/US2014/047888, filed Jul. 23, 2014, six pages.
International Search Report dated Jan. 8, 2016, for PCT Application No. PCT/US2015/057644, filed Oct. 27, 2015, four pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the $6^{th}$ International Conference on Multimodal Interfaces*, State College, PA, Oct. 13-15, 2004, *ICMI '04, ACM* pp. 289-296.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Jul. 8, 2011, for U.S. Appl. No. 12/110,075, filed Apr. 25, 2008, 14 pages.
Non-Final Office Action dated Jul. 11, 2011, for U.S. Appl. No. 12/110,024, filed Apr. 25, 2008, 12 pages.
Non-Final Office Action dated Aug. 17, 2011, for U.S. Appl. No. 12/333,250, filed Dec. 11, 2008, 12 pages.
Non-Final Office Action dated Jan. 25, 2012, for U.S. Appl. No. 12/110,075, filed Apr. 25, 2008, 21 pages.
Non-Final Office Action dated Mar. 9, 2012, for U.S. Appl. No. 12/238,342, filed Sep. 25, 2008, 26 pgs.
Non-Final Office Action dated May 3, 2012, for U.S. Appl. No. 12/238,333, filed Sep. 25, 2008, 22 pgs.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Jul. 3, 2012, for U.S. Appl. No. 12/110,024, filed Apr. 25, 2008, 19 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final Office Action dated Jan. 2, 2013, for U.S. Appl. No. 12/038,760, filed Feb. 27, 2008, 20 pages.
Non-Final Office Action dated Jan. 7, 2013, for U.S. Appl. No. 12/238,333, filed Sep. 25, 2008, 20 pgs.
Non-Final office Action dated Jan. 7, 2013, for U.S. Appl. No. 12/545,604, filed Aug. 21, 2009, 12 pages.
Non-Final Office Action dated Feb. 15, 2013, for U.S. Appl. No. 12/238,342, filed Sep. 25, 2008, 15 pages.
Non-Final Office Action dated Mar. 28, 2013, for U.S. Appl. No. 12/110,075 filed Apr. 25, 2008, 14 pages.
Non-Final Office Action dated Mar. 29, 2013 for U.S. Appl. No. 13/737,779 filed Jan. 9, 2013, nine pages.
Non-Final Office Action dated Sep. 6, 2013, for U.S. Appl. No. 12/847,987 filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.

(56) References Cited

OTHER PUBLICATIONS

Non-Final Office Action dated Jan. 2, 2014, for U.S. Appl. No. 12/545,754, filed Aug. 21, 2009, 11 pages.
Non-Final Office Action dated Jan. 3, 2014, for U.S. Appl. No. 12/545,557, filed Aug. 21, 2009, 9 pages.
Non-Final Office Action dated Jan. 31, 2014, for U.S. Appl. No. 13/448,182 filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.
Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015, for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Non-Final Office Action dated Apr. 14, 2016, for U.S. Appl. No. 14/558,529, filed Dec. 2, 2014, twenty pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
Non-Final Office Action dated Dec. 14, 2016, for U.S. Appl. No. 14/550,686, filed Nov. 21, 2014, eight pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.
Notice of Allowance dated Aug. 28, 2012, for U.S. Appl. No. 12/333,250, filed Dec. 11, 2008, nine pages.
Notice of Allowance dated May 23, 2013, for U.S. Appl. No. 12/110,024, filed Apr. 25, 2008, five pages.
Notice of Allowance dated Jun. 10, 2013, for U.S. Appl. No. 12/545,557, filed Aug. 21, 2009, 9 pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, ten pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, 10 pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Notice of Allowance dated Dec. 2, 2016, for U.S. Appl. No. 14/615,186, filed Feb. 5, 2015, seven pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Search Report dated Oct. 14, 2015, for TW Application No. 103116003, one page.
Search Report dated Nov. 12, 2015, for ROC (Taiwan) Patent Application No. 103105965, with English translation, two pages.
TW Search Report dated May 4, 2016, for TW Application No. 104115152, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Wilson, a.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.
Yang, J-H. et al. (Jul. 2013). "A Noise-Immune High-Speed Read-out Circuit for In-Cell Touch Screen Panels," *IEEE Transactions on Circuits and Systems—1: Regular Papers* 60(7):1800-1809.

\* cited by examiner

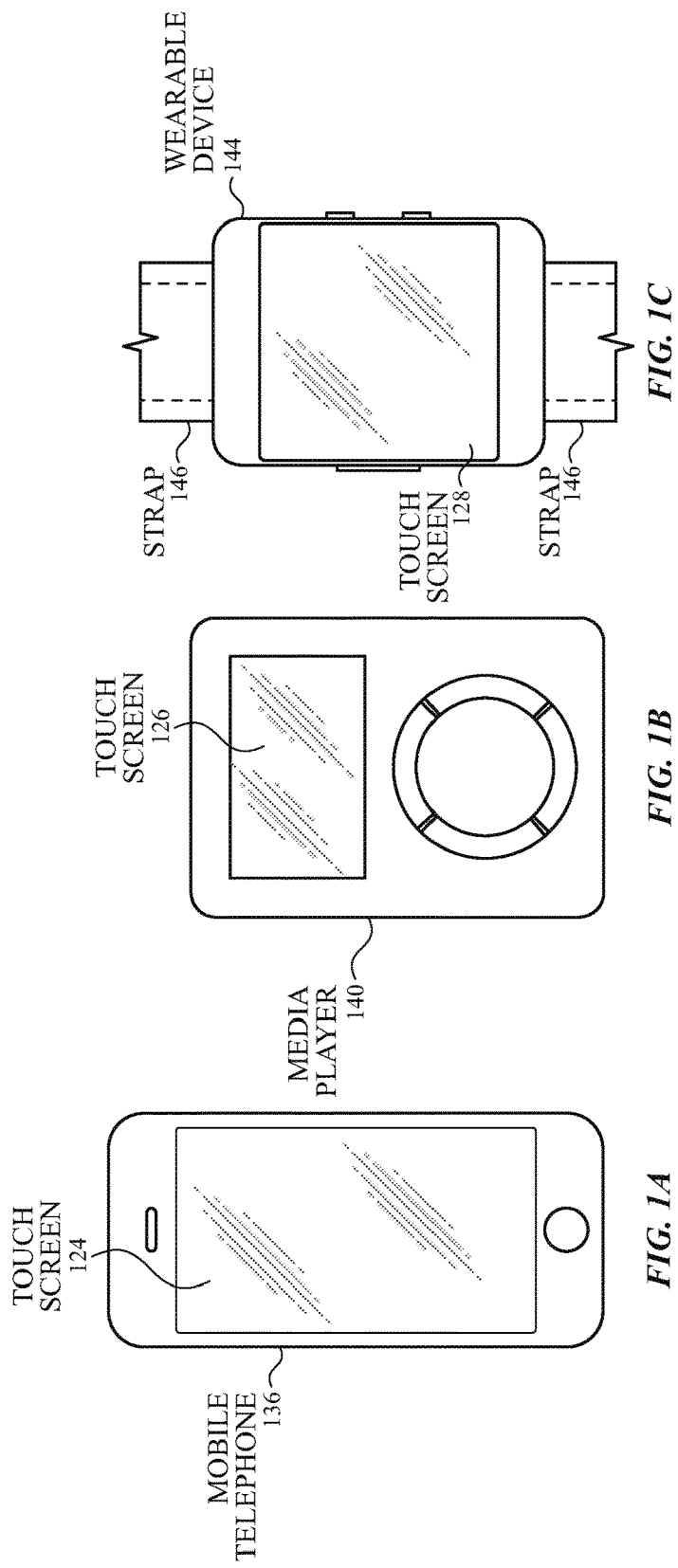

BACK OF COVER TOUCH SENSORS

CROSS-REFERENCE TO RELATED APPLICATIONS

This application claims benefit of U.S. Provisional Patent Application No. 62/384,129, filed Sep. 6, 2016, which is hereby incorporated by reference in its entirety.

FIELD OF THE DISCLOSURE

This relates to touch sensors configurations for reducing electrostatic discharge (ESD) events in the border area of the touch sensor panel, and more specifically, to touch sensors where electrodes are formed on the cover material and/or the opaque mask.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the device. In general, touch screens can recognize a touch event and the position of the touch event on the touch sensor panel, and the computing system can generate touch images. A controller can interpret the touch images in accordance with the display appearing at the time of the touch event, and thereafter can perform one or more actions based on the touch image.

To reduce the thickness and/or manufacturing costs of the touch sensor panel, some or all of the touch sensors can be disposed on the cover material and/or the opaque mask, thereby avoiding a separate substrate. The cover material can include an opaque mask (e.g., black mask) formed along one or more portions of the cover material to conceal bond pads (for off-panel connections) and/or traces used to route signals from touch electrodes to the bond pads. In some instances, the opaque mask can include one or more materials that outgas during manufacture due to, e.g., high temperature deposition processes. The outgas sing can cause the conductive material that forms at least a portion of the routing traces, bond pads, and/or touch sensors located in the border area to have a larger resistance. The larger resistance can make the routing traces, bond pads, and/or touch sensors susceptible to certain events such as arcing and discharge/joule heating. Accordingly, touch sensor configurations for reducing electrostatic discharge (ESD) events in the border area of the touch sensor panel may be desired.

SUMMARY OF THE DISCLOSURE

This relates to touch sensor configurations for reducing electrostatic discharge (ESD) events in the border area of the touch sensor panel. Touch sensors, especially those where electrodes are formed on the cover material and/or the opaque mask, can be susceptible to certain events such as arcing and discharge/joule heating, which may negatively affect touch sensor performance. Examples of the disclosure can include increasing the trace width, spacing, and/or thickness in the border area relative to the trace width, spacing, and/or thickness in the visible (or active) area along one or more sides of the touch sensor panel. In some examples, touch electrodes can be located exclusively in the visible (or active) areas along one or more sides of the touch sensor panel, while dummy sections can be included in both the border and visible (or active) areas. Additionally or alternatively, one or more gaps can be created between adjacent touch electrodes in the border area. In some examples, touch electrodes located closest to the cross-over to the border area (e.g., closest to the bond pads) can include serpentine routing to match the resistance of an adjacent trace. To avoid joule heating, large differences between the width of the touch electrodes and routing traces can be minimized by configuring the width of the touch electrodes relative to the width of the routing traces to avoid bottleneck areas. In some examples, the stackup in the border area can include thicker conductive material.

BRIEF DESCRIPTION OF THE DRAWINGS

FIGS. 1A-1C illustrate systems in which examples of the disclosure can be implemented

DETAILED DESCRIPTION

Figure 2A:
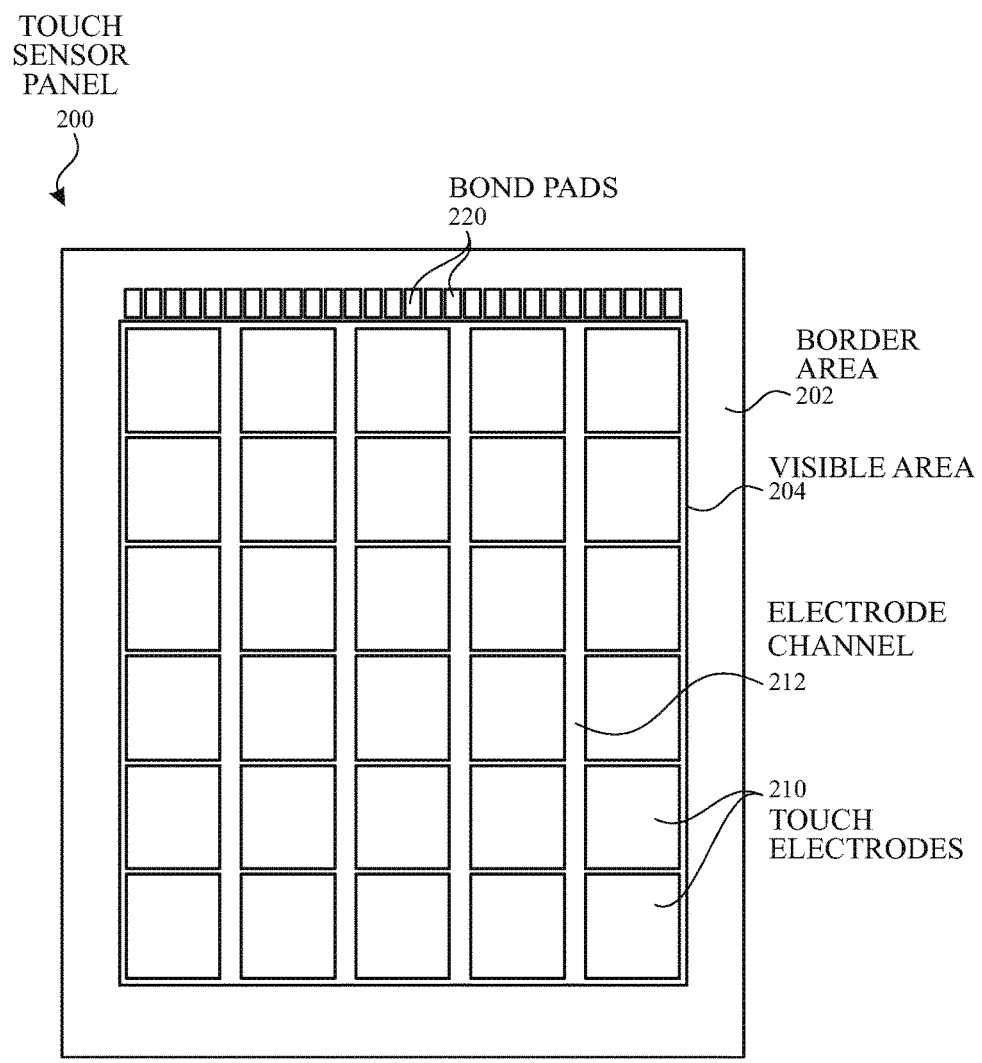
FIGS. 2A-2B illustrate top and cross-sectional views of a touch sensor panel including a conductive material formed on the cover material and/or the opaque mask according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This relates to touch sensors configurations for reducing electrostatic discharge (ESD) events in the border area of the touch sensor panel. Touch sensors, especially those where the electrodes are formed on the cover material and/or the opaque mask, can be susceptible to certain events such as arcing and discharge/joule heating, which may negatively affect touch sensor performance. Examples of the disclosure can include increasing the trace width, spacing, and/or thickness in the border area relative to the trace width, spacing, and/or thickness in the visible (or active) area. In some examples, touch electrodes can be located exclusively in the visible (or active) areas along one or more sides of the touch sensor panel, while dummy sections can be located in both the border and visible (or active) areas. Additionally or alternatively, one or more gaps can be created between adjacent touch electrodes in the border area. In some examples, touch electrodes located closest to the cross-over to the border area (e.g., closest to the bond pads) can include serpentine routing to match the resistance of an adjacent trace. To avoid joule heating, large differences between the width of the touch electrodes and the routing traces can be minimized by configuring the width of the touch electrodes relative to the width of the routing traces to avoid bottleneck areas. In some examples, the stackup in the border area can include thicker conductive material.

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using a strap 146. The systems of FIGS. 1A-1C can utilize the touch sensors configurations and methods for forming thereof, as will be disclosed.

Touch sensors can include a plurality of conductive sections referred to as "touch electrodes." A touch electrode can include an area of conductive material that can be connected to touch circuitry (e.g., sense circuitry and drive circuitry) via one or more routing traces. The touch electrodes can be configured for capacitively coupling to an object (e.g., finger). In some examples, the touch electrodes may not be directly electrically connected to the bond pads.

Routing traces can also include an area of conductive material, but may be smaller in one or more dimensions (e.g., width). For example, routing traces can have a smaller width (e.g., less than ¼ the width of its associated electrode, less than $1/10^{th}$ the width of its associated touch electrode, etc.), along with a shorter, approximately equal, or longer length in the visible (or active) area than its associated electrode. The routing traces may not be configured for capacitively coupling to an object, and some or all of the routing traces may be directly connected to the bond pads.

The terminology used in the description of the various examples herein is for the purpose of describing particular examples only and is not intended to be limiting. As used in the description, the boundaries of a "visible area" can be defined by an opaque mask and/or by one or more portions of the touch sensor panel having different material qualities. For example, the boundaries of opaque mask 322 illustrated in FIG. 3A can also be the boundaries of visible area 304. The "active area" can be defined as areas where the touch electrodes are capable of sensing a touch or hover of an object (e.g., a finger or stylus). For example, the boundaries of border channel 316 illustrated in FIG. 3B can also be the boundaries of an active area.

Mutual capacitance touch sensor panels can be formed from a matrix of touch electrodes forming drive lines and touch electrodes forming sense lines of a substantially transparent conductive material such as Indium Tin Oxide (ITO), often arranged in rows and columns in horizontal and vertical directions on a substantially transparent substrate. Drive lines can be activated by a stimulation signal provided by respective drive circuitry, which can include an alternating current (AC) or unipolar pulsatile voltage source (referred to as a stimulation signal source). To sense touch event(s) on the touch sensor panel, one or more drive lines can be stimulated by the drive circuit, and the sense circuitry can detect the resulting change in the charge coupled onto the sense lines in form of a change in amplitude of the coupled stimulation signal. The change in voltage amplitude values can be indicative of a finger or conductive object touching or in proximity to the panel. The detected voltage values can be representative of node touch output values, with changes to those touch output values indicating the node locations where the touch or proximity events occurred and the amount of touch that occurred at those locations).

Self-capacitance touch sensor panels can be formed from a plurality of touch electrodes, which can be coupled to sense circuitry and can have a self-capacitance to ground. When an object touches or is in close proximity with the touch electrode, an additional capacitance can be formed between the electrode and ground through the object, which can increase the self-capacitance of the electrode. This change in the self-capacitance of the electrode can be detected by the sensing circuitry. Each touch electrode can act as a touch node, which can be a point on the screen at which a touch measurement can be made.

In some touch sensor panel designs, signals from the touch electrodes can be routed using routing traces to a plurality of bond pads for off-board connections. The routing traces can be conductive (e.g., metal) traces located at least partially in the border areas of the touch sensor panel where transparency may not desired. An opaque mask (e.g., black mask) can be printed on an interior of a top cover (i.e., cover material) of the touch sensor panel. The opaque mask can extend between the visible area of the touch sensor panel and the sides of the housing of the device. The mask can serve to cover the border areas so that the routing traces and bond pads are not viewable.

Figure 2B:
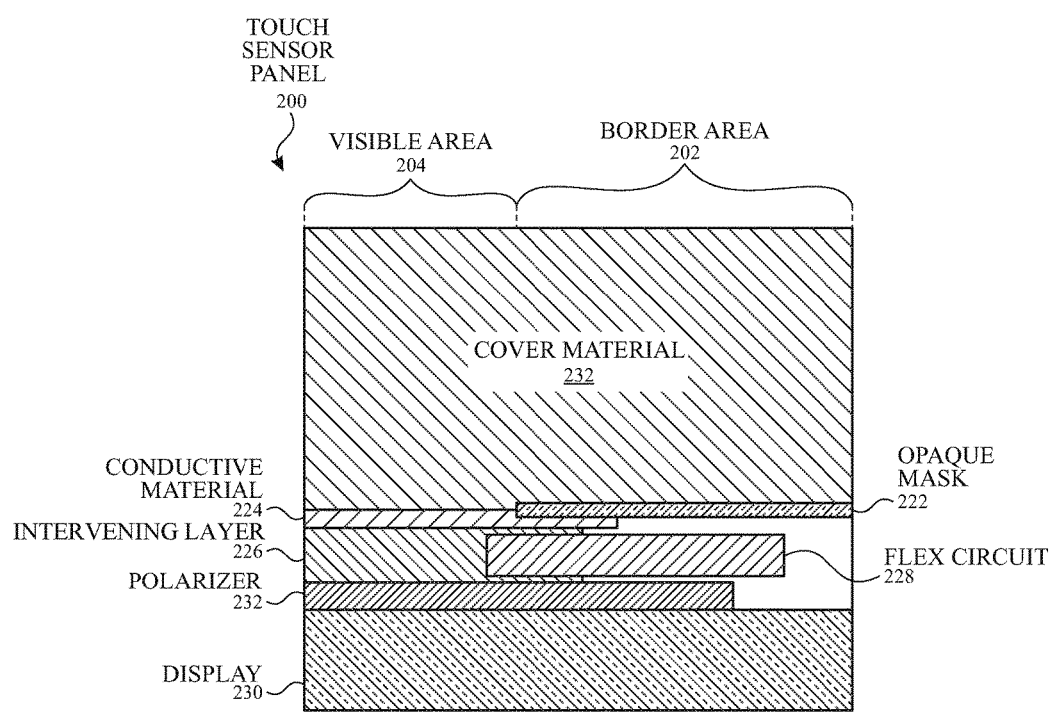

In some touch sensor panel designs, some or all of the plurality of conductive sections can be formed on the cover material and/or the opaque mask. The conductive sections can form the touch electrodes, routing traces, and/or bond pads. In some instances, the conductive sections can be formed such that the stackup can lack an intervening layer (e.g., an adhesive such as a pressure sensitive adhesive (PSA) or insulating layer) located between the cover material and/or the opaque mask and the conductive sections formed on thereon. It should be appreciate that the designs described here may also be used in instances where one or more intervening layers are located between one or more conductive sections and the cover material and/or the opaque mask. FIGS. 2A-2B illustrate top and cross-sectional views of a touch sensor panel including a conductive material formed on the cover material according to examples of the disclosure. Touch sensor panel 200 can include display 230, polarizer 232, intervening layer 226, flex circuit 228, conductive material 224, opaque mask 222, and cover material 232. Display 230 and polarizer 232 can be configured to emit light to display one or more images that can transmit through intervening layer 226, conductive material 224, and cover material 232 in visible area 204. Intervening layer 226 can be configured to adhere the display portion of the touch sensor panel 200 to the touch sensors and cover material 232. Touch electrodes 210 can be formed at least partially with conductive material 224. Touch electrodes 210 can be electrically coupled to bond pads 220 using one or more routing traces (not shown) located in electrode channel 212. In some examples, the one or more routing traces can be formed with conductive material 224. Bond pads can make electrical connections to one or more off-board connections (e.g., flex circuit 228). In some examples, bond pads 220 can be formed with conductive material 224. Opaque mask 222 can include one or more opaque materials (e.g., conductive ink) and be configured to conceal portions of one or more touch electrodes, portions of one or more routing traces, and/or bond pads 220. Opaque mask 222 can be located around the outer perimeter of touch sensor panel and can be included in border area 202.

As shown in FIG. 2B, conductive material 224 can contact at least a portion of cover material 232 and at least a portion of opaque mask 222 without intervening layer 226 located between conductive material 224 and opaque mask 222. Although forming conductive material 224 on the cover material 232 may reduce the thickness of the touch sensor panel stackup, reduce manufacturing costs, or both, the conductive material may become more susceptible to certain events due to its larger resistance caused by outgassing of opaque mask 222 during manufacture.

Certain events can include arcing and discharge/joule heating, for example. Arcing can occur between adjacent sections of conductive material where electrical coupling can occur. Discharging can occur at narrow sections of the conductive material (e.g., ITO). For example, areas where the touch electrodes connect to the routing traces can be susceptible to discharge, where the area of a touch electrode can be much larger than the width of a routing trace. In some instances, events such as ESD events can cause spontaneous current flow in one or more portions of the touch sensor panel. The spontaneous current flow can cause heating within a given region (e.g., a routing trace) or arcing based on the potential difference between a plurality of different regions. These certain events (e.g., arcing, discharge/joule heating, and/or spontaneous current flow) can negatively affect device performance.

Figure 3A:
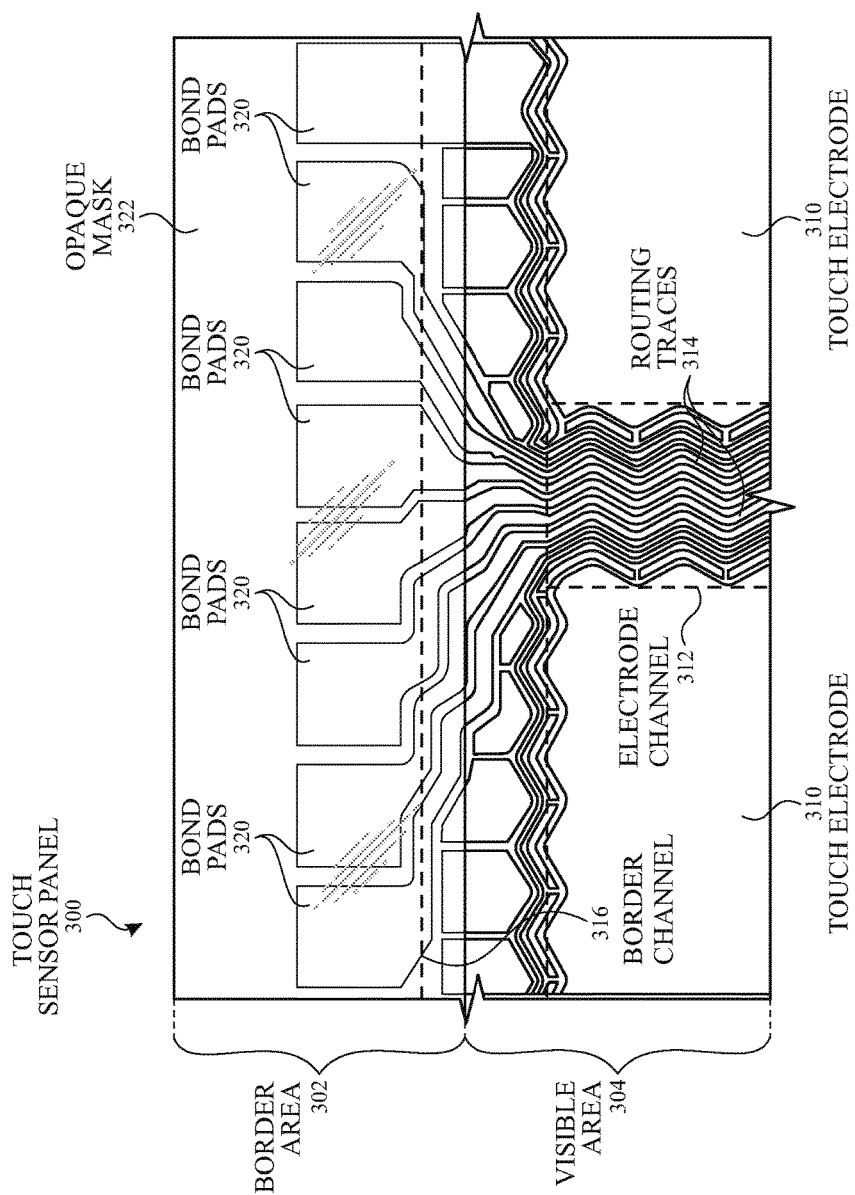
FIG. 3A illustrates a top view of a portion of a touch sensor panel including routing traces with increased widths in the border area according to examples of the disclosure.

In some examples, the trace width can be increased in the border area relative to the trace width in the visible (or active) area. FIG. 3A illustrates a top view of a portion of a touch sensor panel including routing traces with increased widths in the border area according to examples of the disclosure. Touch sensor panel 300 can include touch electrodes 310 and routing traces 314 located in visible area 304 (e.g., in electrode channel 312). Touch sensor panel 300 can further include bond pads 320 and routing traces 314 located in border area 302 (e.g., in border channel 316). Opaque mask 322 can be included in border area 302 and can be configured to hide at least a portion of routing traces 314 and bond pads 320. In some examples, routing traces 314 located in border area 302 can include a different, non-transparent material than routing traces 314 located in visible area 304.

To prevent or reduce the risk of joule heating, the trace width can be increased such that the resistance can be decreased. In some instances, increasing the width of the entire portion of the routing traces can lead decreased the sensitivity of the touch sensors due to a decrease in touch sensing area for a given touch sensor panel size. Electrode channel 312 can be an area, located in the visible area, between two adjacent touch electrodes 310 through which one or more routing traces 314 may pass (e.g., to facilitate a connection between respective touch electrodes to the border region). Border channel 316 can be an area between touch electrodes and bond pads 320. In some examples, a portion of border channel 316 can be located in visible area 304, and another portion of border channel 316 can be located in border area 302.

Figure 3B:
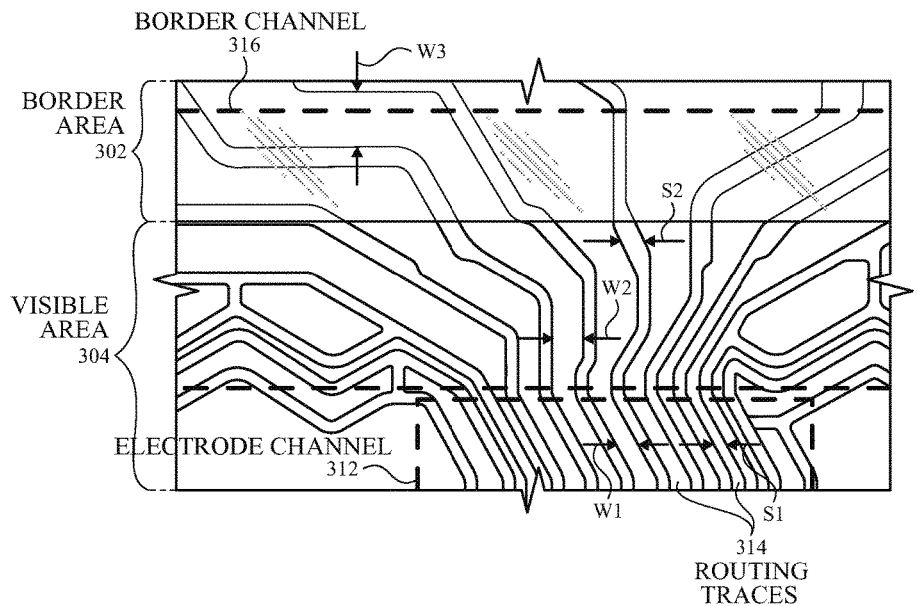
FIG. 3B illustrates a magnified top view of the routing traces located in a plurality of border and electrode channels according to examples of the disclosure.

To maintain the sensitivity of the touch sensor panel, the width of routing traces 314 can vary. FIG. 3B illustrates a magnified top view of the routing traces located in both electrode and border channels according to examples of the disclosure. Routing traces 314 located in electrode channel 312 can be configured with a width $w_1$ and a plurality of widths $w_2$ and $w_3$ in border channel 316. Width $w_1$ can be less than widths $w_2$ and $w_3$. In some examples, width $w_1$ can be constant in electrode channel 312. In some examples, the width of routing trace 314 can vary (e.g., include sections having constant width, where each section can have a different width than an adjacent section) in border channel 316. For example, the width of routing trace 314 in visible area 304 can be less than the width of routing trace 314 in border area 302. To prevent or reduce the risk of joule heating, one or more sections having an intermediate width (e.g., width $w_2$ can be less than width $w_3$, but greater than width $w_1$) can be included.

In some examples, the width of routing trace 314 in border channel 316 can be different in visible area 304 than in border area 302. Additionally or alternatively, routing trace 314 can include multiple widths within the visible (or active) area 304 and/or border area 302. For example, routing trace 314 can have a first width in electrode channel 312; second and third widths in the portion of border channel 316 located in visible area 304; and a fourth width in the portion of border channel 316 located in border area 302. In some examples, the width(s) of routing trace 314 in portions of border channel 316 located in both visible area 304 and border area 302 can be greater than the width(s) of routing trace 314 in electrode channel 312. Although FIG. 3B illustrates routing trace 314 having three different widths, examples of the disclosure can include any number of widths.

In some examples, the thickness of routing traces 314 can differ in electrode channel 312 than in border channel 316. For example, the thickness of routing traces 314 can be greater in border channel 316 than in electrode channel 312. Examples of the disclosure can include routing traces with any number of different thicknesses including, but not limited to, two different thicknesses in border channel 316 (e.g., a greater thickness in border area 302 than in visible area 304) and a third different thickness in electrode channel 312.

Arcing can occur between adjacent traces due to differences in the electrical potentials of adjacent traces. To prevent or reduce the risk of arcing, the breakdown impedance between adjacent routing traces should be larger than the maximum resistance and/or the spacing between the adjacent routing traces should be increased. Adjacent routing traces 314 can be having spacing $s_1$ in electrode channel 312 and spacing $s_2$ in border channel 316. Spacing $s_2$ can be greater than spacing $s_1$. In some examples, spacing $s_1$ can be constant in electrode channel 312. In some examples, the spacing between adjacent routing traces 314 can vary (not shown) in border channel 316.

Although FIG. 3B illustrates adjacent routing traces as having two different spacing widths, examples of the disclosure can include any number of spacing widths. For example, adjacent routing traces in border channel 316 can be spaced closer together in visible area 304 than in border area 302. Additionally or alternatively, multiple spacings between adjacent routing traces can exist within the visible (or active) area 304 and/or border area 302. For example, adjacent routing traces can have a first spacing in electrode channel 312; second and third spacings in the portion of border channel 316 located in visible area 304; and a fourth spacing in the portion of border channel 316 located in border area 302. In some examples, the spacing(s) of adjacent routing traces in portions of border channel 316 located in both visible area 304 and border area 302 can be greater than the spacing(s) of adjacent routing traces in electrode channel 312.

Figure 3C:
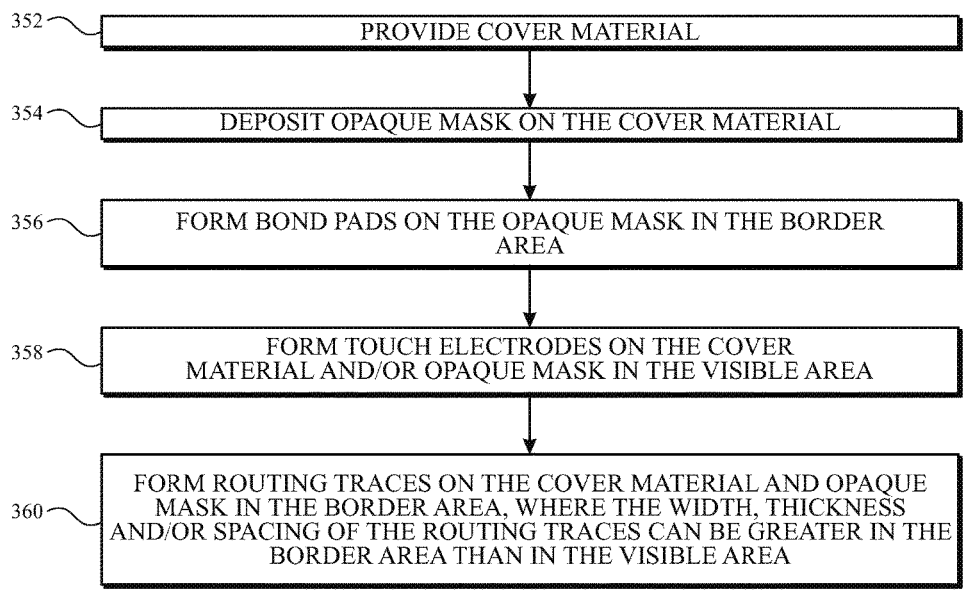
FIG. 3C illustrates a method for forming an exemplary touch sensor panel with the trace widths increased in the border area relative to the trace widths in the visible area according to examples of the disclosure.

FIG. 3C illustrates a method for forming an exemplary touch sensor panel with increased trace widths in the border area relative to the trace widths in the visible area according to examples of the disclosure. A cover material (e.g. cover material 232 illustrated in FIG. 2B) can be provided (step 352 of process 350). An opaque mask (e.g., opaque mask 322 illustrated in FIG. 3A) can be deposited on the cover material (step 354 of process 350). Bond pads (e.g., bond pads 320 illustrated in FIG. 3A) can be formed on the opaque mask in the border area (e.g., border area 302 illustrated in FIG. 3A) (step 356 of process 350). Touch electrodes (e.g., touch electrodes 310 illustrated in FIG. 3A) can be formed on the cover material in the visible area (e.g., visible area 304 illustrated in FIG. 3A) (step 358 of process 350). Routing traces (e.g., routing traces 314 illustrated in FIGS. 3A-3B) can be formed on the cover material and/or opaque mask in visible and border areas, where the width, thickness, and/or spacing (e.g., w2 and/or s2 illustrated in FIG. 3B) of the routing traces in the border area can be greater than the thickness (e.g., w1 and/or s1 illustrated in FIG. 3B) in the visible area (step 360 of process 350). In some examples, forming the bond pads, touch electrodes, and/or routing traces can be performed in the same step. Although FIGS. 3A-3C illustrate and are discussed in the context of a visible area, examples of the disclosure can include increased trade widths, thicknesses, and/or spacings in the border area relative to trace widths in the active area.

Figure 4A:
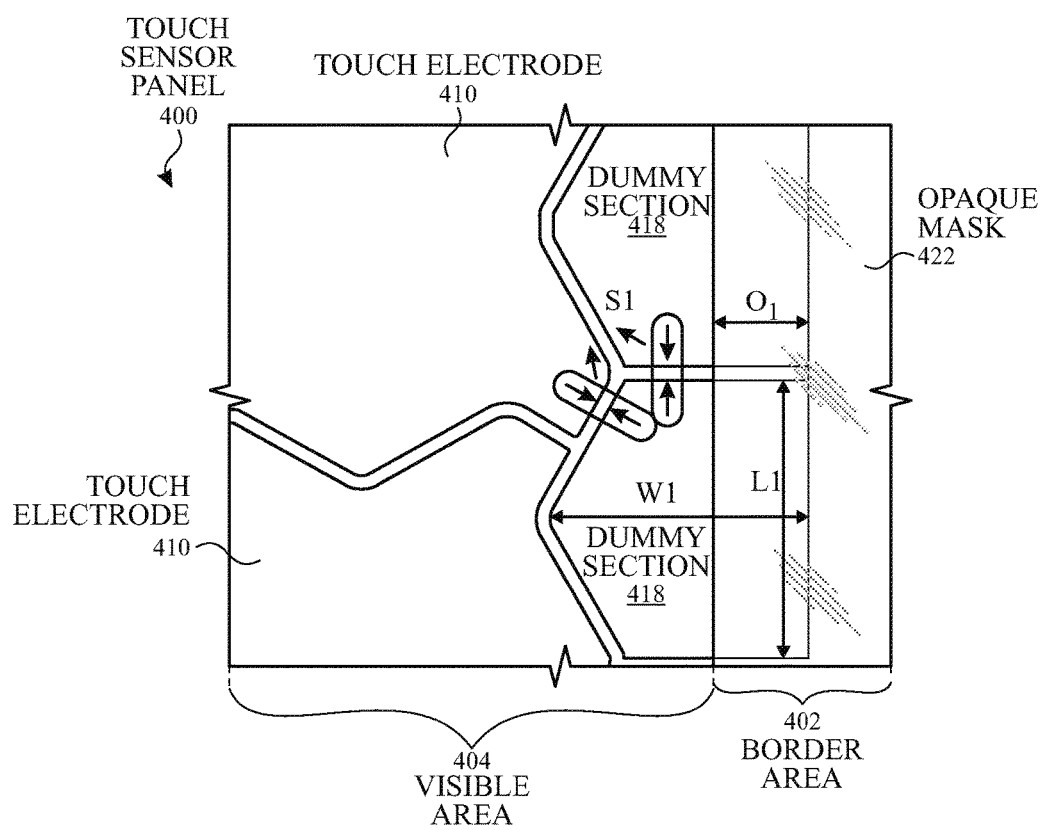
FIG. 4A illustrates a touch sensor panel including one or more dummy sections according to examples of the disclosure.

Arcing can also occur between adjacent touch electrodes. To prevent or reduce the risk of arcing between adjacent touch electrodes, dummy sections can be included in the border area of the touch sensor panel. FIG. 4A illustrates a touch sensor panel including one or more dummy sections located in the border area according to examples of the disclosure. Touch sensor panel 400 can include a plurality of touch electrodes 410 located in visible area 404. In some examples, plurality of touch electrodes 410 can be located exclusively in visible area 404. By locating touch electrodes 410 in visible area 404, pixel-to-pixel coupling can be limited to the visible area 404, which may be an area less susceptible to arcing and joule heating (e.g., due to one or more material properties, such as resistance, of the conductive material and/or opaque mask being different).

Dummy sections 418 can be located partially in visible area 404 and partially in border area 402 (e.g., to enhance optical uniformity). Dummy sections 418 can be formed of conductive material and can be electrically isolated from touch electrodes 410. In some examples, dummy sections 418 can include the same conductive material as touch electrodes 410. The dummy sections can be sized small enough such that arcing can be reduced or prevented between dummy sections and touch electrodes. The size of the dummy sections can be based on the risk of arcing. For example, smaller sized dummy sections can have a lower risk of arcing to a touch electrode and/or other dummy sections. In some examples, the width, height, or both of the dummy sections can less than ¼th of the width, height, or both of the touch electrodes. In some examples, the width, height, or both of the dummy sections can be less than ⅛th of the width, height, or both of the touch electrodes. In some examples, dummy sections 418 can be floating. Even if arcing occurs between dummy sections 418, the dummy sections can be electrically isolated from the touch electrodes and may not be negatively impacted.

Each dummy section 418 can have a width $w_1$, length $L_1$, and can be spaced $s_1$ apart from an adjacent dummy section 418. In some examples, width $w_1$ and length $L_1$ can be less than the width and length of touch electrodes 410. Spacing $s_1$ between adjacent dummy sections 418 can be the same as the spacing between a dummy section 418 and a touch electrode 410 and between adjacent touch electrodes 410. In some examples, spacing $s_1$ can be 25 μm. The dummy sections can also be located such that an overlap distance $O_1$ exists. In some examples, overlap distance $O_1$ can be greater than or equal to 1 μm.

Although FIG. 4A illustrates dummy section 418 as having a pentagon shape, examples of the disclosure can include dummy sections with any shape including, but not limited to, trapezoids, triangles, diamonds, octagons, semi-octagons, arrows, and parallelograms. Although FIG. 4A illustrates one side of the touch sensor panel as having touch electrodes located exclusively in the visible area, examples of the disclosure can include touch electrodes located exclusively in the visible area on all sides of the touch sensor panel. Alternatively, examples of the disclosure can include touch electrodes located exclusively in the visible area on some (e.g., 2 or 3), but not all, sides of the touch sensor panel. For example, touch electrodes can be located exclusively in the visible area on 3 sides of the touch sensor panel, but on the fourth side, the touch electrodes can be located in both the visible area and the border area. The dummy sections can be included in some or all sides of the border area. Although FIG. 4A illustrates dummy sections located between touch electrodes and the edge of a touch sensor panel, examples of the disclosure can include dummy sections located between touch electrodes and routing traces (as illustrated in FIG. 3A).

Figure 4B:
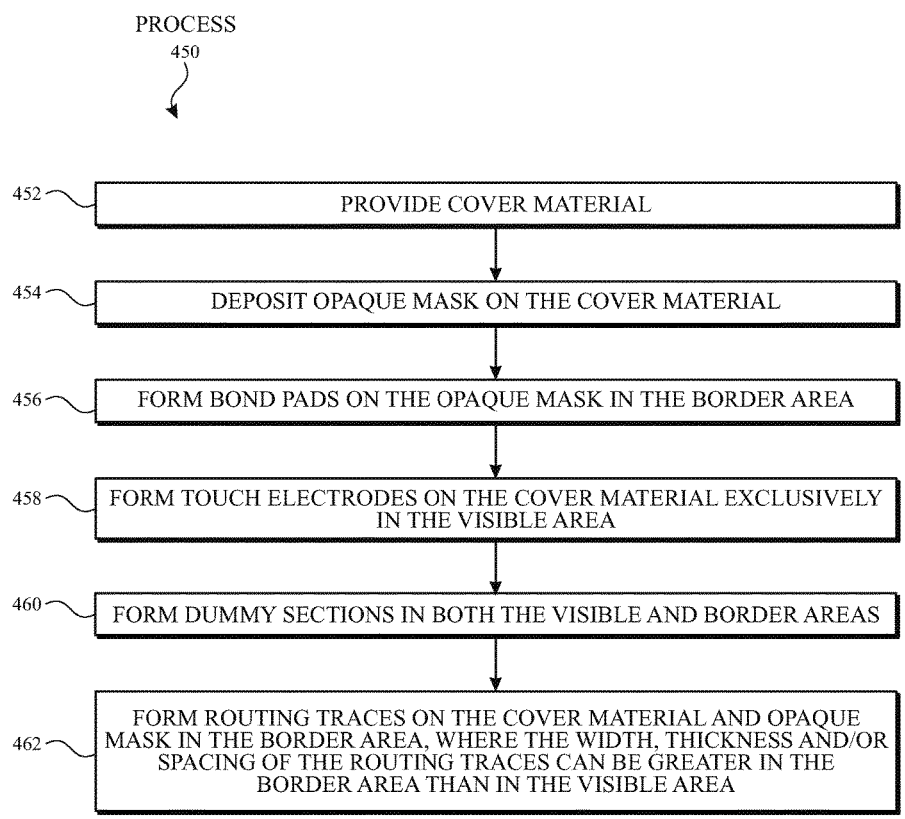
FIG. 4B illustrates a method for forming an exemplary touch sensor panel with the touch electrodes located exclusively in the visible areas along one or more sides of the touch sensor panel, and dummy sections located in both the border and visible areas according to examples of the disclosure.

FIG. 4B illustrates a method for forming an exemplary touch sensor panel with the touch electrodes located exclusively in the visible areas, and dummy sections located in both the border and visible areas according to examples of the disclosure. A cover material (e.g., cover material 232 illustrated in FIG. 2B) can be provided (step 452 of process 450). An opaque mask (e.g., opaque mask 422 illustrated in FIG. 4A) can be deposited on the cover material (step 454 of process 450). Bond pads (e.g., bond pads 220 illustrated in FIG. 2A) can optionally be formed on the opaque mask in the border area (e.g., border area 402 illustrated in FIG. 4A) (step 456 of process 450). Touch electrodes (e.g., touch electrodes 410 illustrated in FIG. 4A) can be formed on the cover material exclusively in the visible area (e.g., visible area 404 illustrated in FIG. 4A) along one or more sides of the touch sensor panel (step 458 of process 450). Dummy sections (e.g., dummy sections 418 illustrated in FIG. 4A) can be formed on the cover material and/or the opaque mask in both the visible and border areas (step 460 of process 450). Routing traces (e.g., routing traces 314 illustrated in FIGS. 3A-3B) can be formed on the cover material and/or the opaque mask in visible and border areas (step 460 of process 450). In some examples, forming the bond pads, touch electrodes, dummy sections, and/or routing traces can be performed in the same step. Although FIGS. 4A-4B illustrate and are discussed in the context of a visible area, examples of the disclosure can include dummy sections located in the active area of the touch sensor panel.

Figure 5:
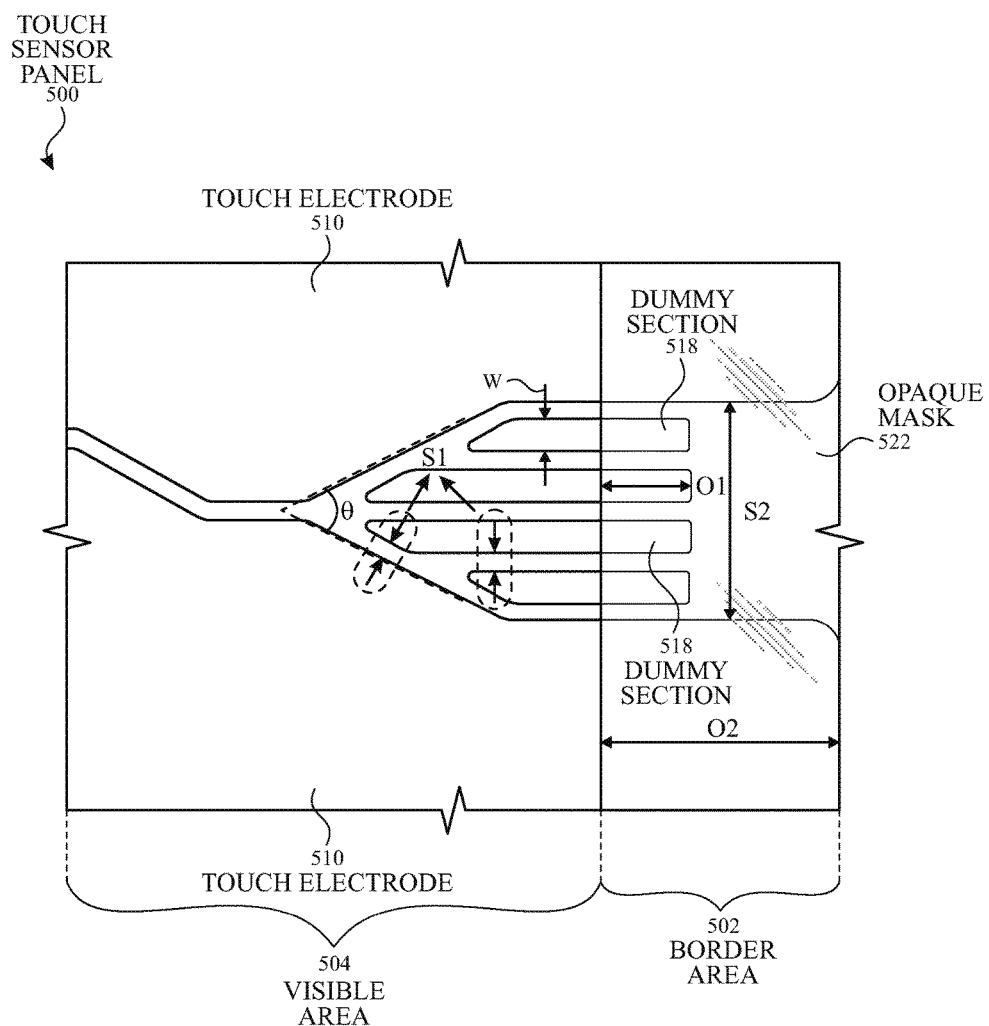
FIG. 5 illustrates a touch sensor panel including a gap in the border area between adjacent touch electrodes according to examples of the disclosure.

In some examples, one or more touch electrodes can cross into the border area (which may, in some instances, also extend the active region of the touch sensor panel into the border area). In some instances, one or more gaps can be created between adjacent touch electrodes in the border area to prevent or reduce the risk of arcing. FIG. 5 illustrates an exemplary touch sensor panel including a gap in the border area between adjacent touch electrodes according to examples of the disclosure. Touch sensor panel 500 can include a plurality of touch electrodes 510, where some of the plurality of touch electrodes 510 can be located in both visible area 504 and border area 502. By extending some of the touch electrodes 510 to border area 502, the touch sensitivity may not be reduced near the border area. To prevent or reduce the risk of arcing, a gap $S_2$ between adjacent touch electrodes 510 can be created in border area 502. The size of gap $S_2$ can be such that the likelihood of pixel-to-pixel arcing between touch electrodes in border area 502 can be reduced. In the visible area 504, an angle θ (e.g., less than 180°) between edges of adjacent touch electrodes 510 can be formed to create the gap.

Touch sensor panel 500 can include one or more of dummy sections 518 located at least partially in the gap. Locating dummy sections 518 at least partially in visible area 504 can reduce the likelihood that non-uniform patterning of the touch sensor panel can be perceptible by a user. Plurality of dummy sections 518 can include any number of spatially separated sections of conductive material. In some examples, plurality of dummy sections 518 can be spatially separated in border area 502, but can be continuous (e.g., dummy sections 518 can be connected together to form one dummy section) in visible area 504 (not shown). Each dummy section 518 can have a width W, and adjacent dummy sections 518 can have a spacing $S_1$. In some examples, two or more dummy sections can have different widths. The width W of the dummy sections can be configured such that arcing can be prevented or the risk can be reduced. For example, the width W of a dummy section can be less than the width of a touch electrode 510. In some examples, the spacing between adjacent touch electrodes 510 and between a touch electrode 510 and a dummy section 518 can also be spacing $S_1$. Spacing $S_1$ and width W can both be less than gap size $S_2$.

The dummy sections can be located such that one or more dummy sections have an overlap distance $O_1$ (i.e., the distance from the inner edge of opaque mask 522 to the outer edge of dummy section 518) exists. Touch electrode can be located such that an overlap distance $O_2$ (i.e., the distance from the inner edge of opaque mask 522 to outer edge of touch electrode 510) exists. Overlap distance $O_2$ can be greater than or equal to overlap distance $O_1$. In some examples, overlap distance $O_1$, overlap distance $O_2$, or both can be greater than or equal to 1 μm. Although FIG. 5 illustrates dummy sections 518 as having rectangular or trapezoidal shapes, examples of the disclosure can include dummy sections with any shape including, but not limited to, triangles, diamonds, octagons, semi-octagons, arrows, and parallelograms. Examples of the disclosure can include forming the touch sensors illustrated in FIG. 5 using the design/operation discussed in the context of FIG. 4B. It should be appreciated the one or more dummy sections 518 described above with respect to FIG. 5 may also be utilized between touch electrodes that do not cross into the border area of the touch sensor panel. Although FIG. 5 illustrates and is discussed in the context of a visible area, examples of the disclosure can include gaps located in the active area of the touch sensor panel.

Figure 6A:
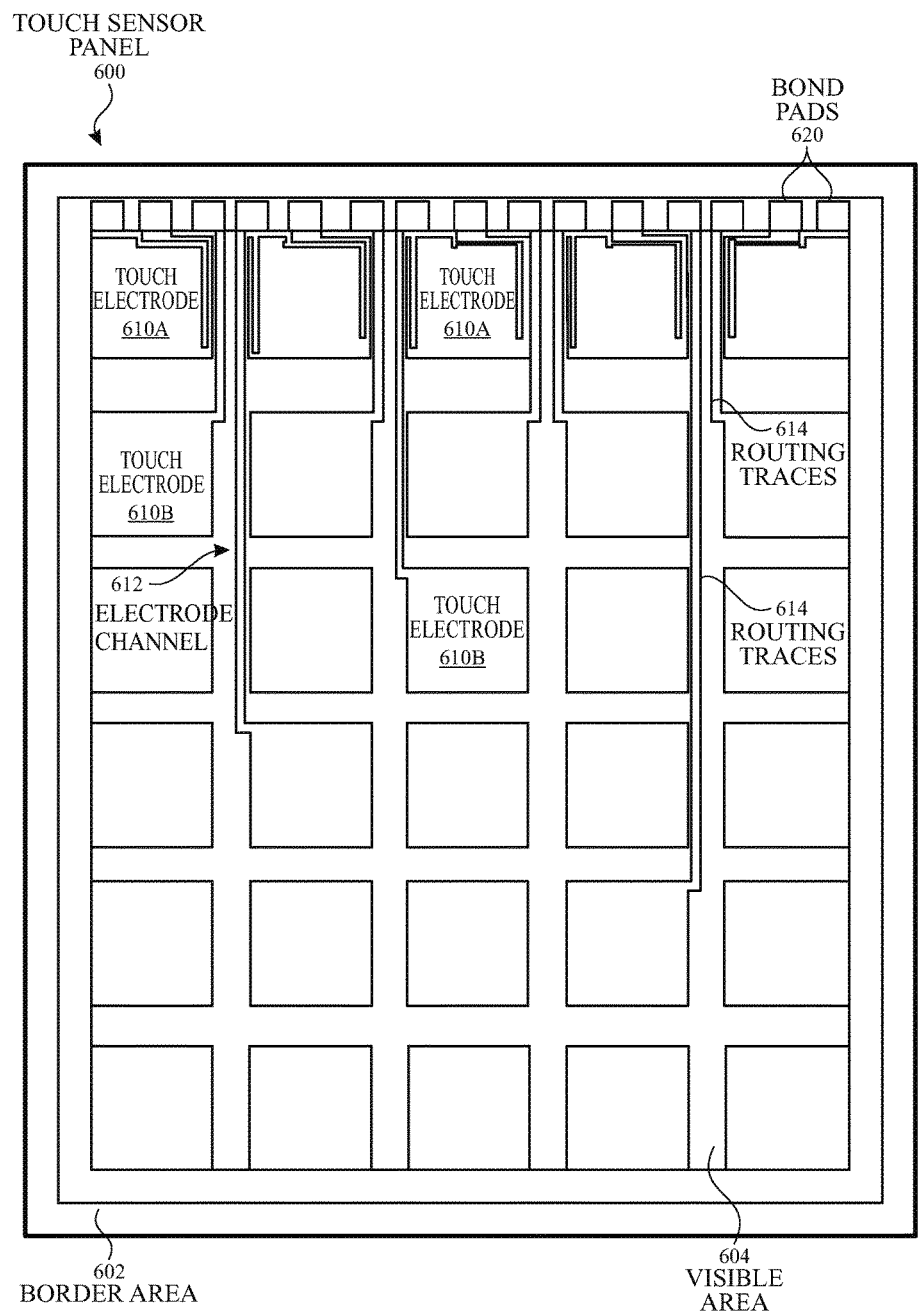
FIG. 6A illustrates a top view of an exemplary touch sensor panel including serpentine routing according to examples of the disclosure.

In some examples, touch electrodes located closest to the cross-over to the border area (e.g., closest to the bond pads) can include routing traces configured to match the resistance of an adjacent routing trace. FIG. 6A illustrates a top view of an exemplary touch sensor panel including serpentine routing according to examples of the disclosure. Touch sensor panel 600 can include a plurality of bond pads 620 and routing traces 614 located in a border area 602. Touch sensor panel 600 can further include a plurality of touch electrodes and routing traces 614 located in a visible area 604. The plurality of touch electrodes can include plurality of touch electrodes 610*a* and plurality of touch electrodes 610*b*. Plurality of touch electrodes 610*a* can be located closer to plurality of bond pads 620 than plurality of touch electrodes 610*b*.

Figure 6B:
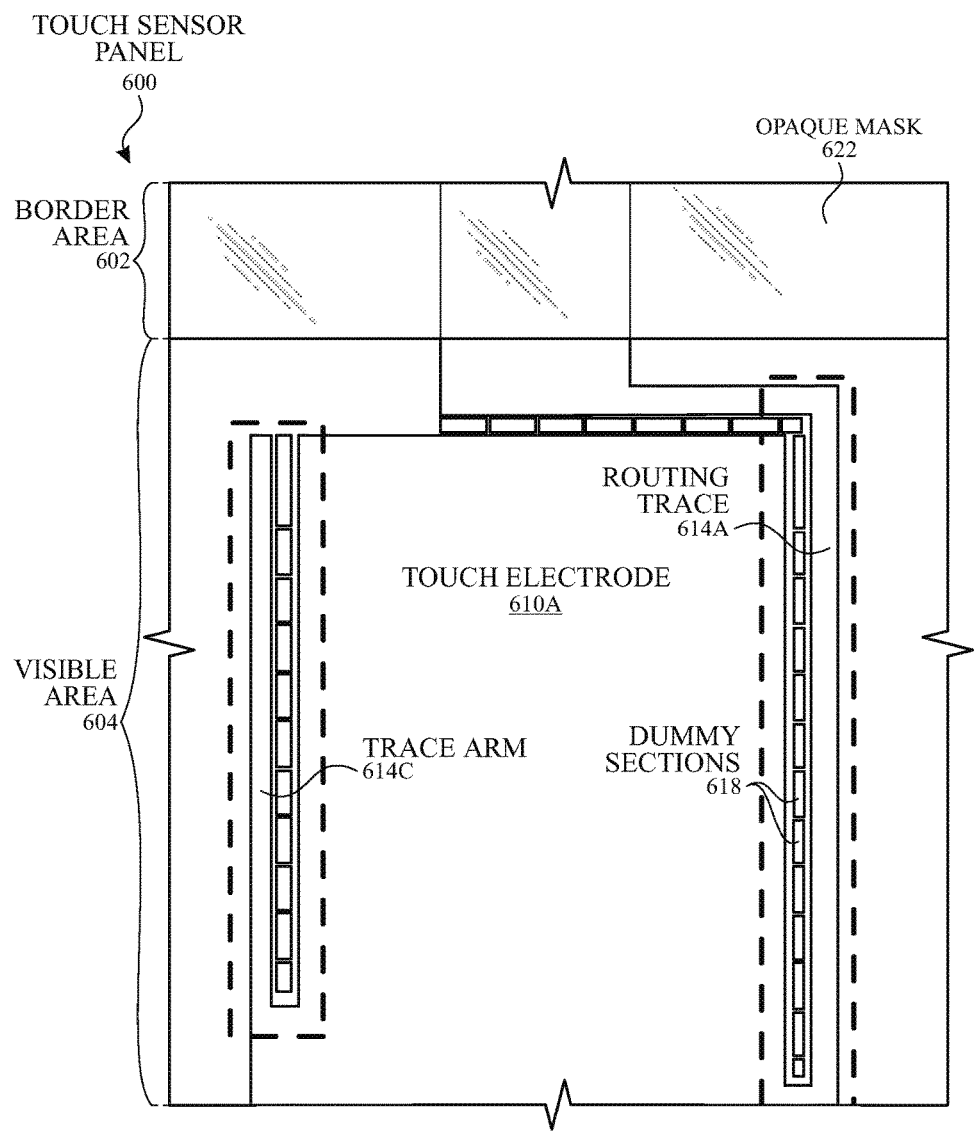
FIGS. 6B-6C illustrate magnified top views of the touch electrodes and serpentine routing according to examples of the disclosure.
Figure 6C:
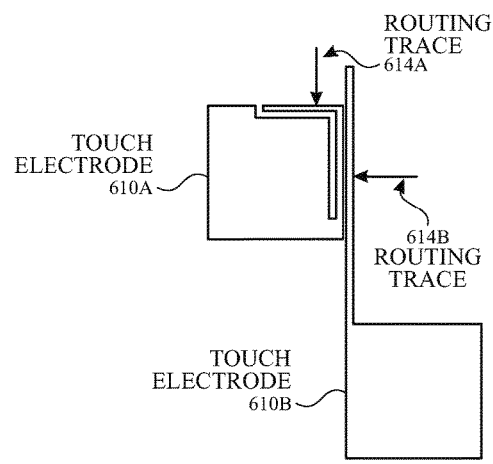

FIGS. 6B-6C illustrate magnified views of the touch electrodes and routing traces according to examples of the disclosure. Routing traces 614 can include routing traces 614a and routing traces 614b. Routing traces 614a can electrically couple touch electrodes 610a to plurality of bond pads 620, and routing traces 614b can electrically couple touch electrodes 610b to plurality of bond pads 620. Routing traces 614b can be routed in electrode channels 612, which can be located between touch electrodes 610a in areas proximate to plurality of bond pads 620.

Due to the close proximity of touch electrodes 610a to plurality of bond pads 620, touch electrodes 610a can be quickly grounded (e.g., via current flow from the touch electrodes to the bond pads) after an ESD event. On the other hand, touch electrodes 610b, which can be located further from plurality of bond pads 220 than touch electrodes 610a, may incur a delay before being grounded after an ESD test. This can lead to a mismatch in electrostatic potential between a touch electrode 610a and an adjacent routing trace 614b connected to touch electrode 610b from another row. The mismatch in electrostatic potential can lead to arcing between touch electrode 610a and an adjacent routing trace 614b.

To prevent or reduce the risk of arcing, the line resistance of routing traces 614a can be increased such that the electrostatic potential between each touch electrodes 610a and adjacent routing trace 614b match (e.g., by matching the lengths and widths of each routing trace 614a to an adjacent routing trace 614b). In some examples, the ratio of the line resistance of routing trace 614a to the line resistance of routing trace 614b can be between 0.8 and 1.2. As illustrated in the figures, routing trace 614a can be configured as serpentine routing traces. Routing trace 614a can have a longer length than the separation distance between touch electrode 610a and the bond pads. In some examples, routing trace 614a can electrically couple to touch electrode 610a at one or more sides other than the side of touch electrode 610a located closest to the cross-over to border area 602. In some examples, touch electrode 610a can have four sides, where routing trace 614a can run along multiple sides (e.g., two sides such as the right side and top side of FIG. 6B) of touch electrode 610a outside a channel. In some instances, the size of touch electrodes 610a can be smaller than the size of touch electrodes 610b.

In some examples, at least two sections (e.g., routing trace 614a and trace arm 614c) of routing traces can be included, where the sections can be indirectly electrically coupled (e.g., electrically coupled only through touch electrode 610a) to the bond pads. Trace arm 614c can be included to increase the resistance of the sections of routing traces coupled to touch electrode 610a. With the additional sections of routing traces, all routing traces for touch electrode 610a (e.g., routing trace 614a and trace arm 614c) can run along three or four sides of touch electrode 610a.

Figure 6D:
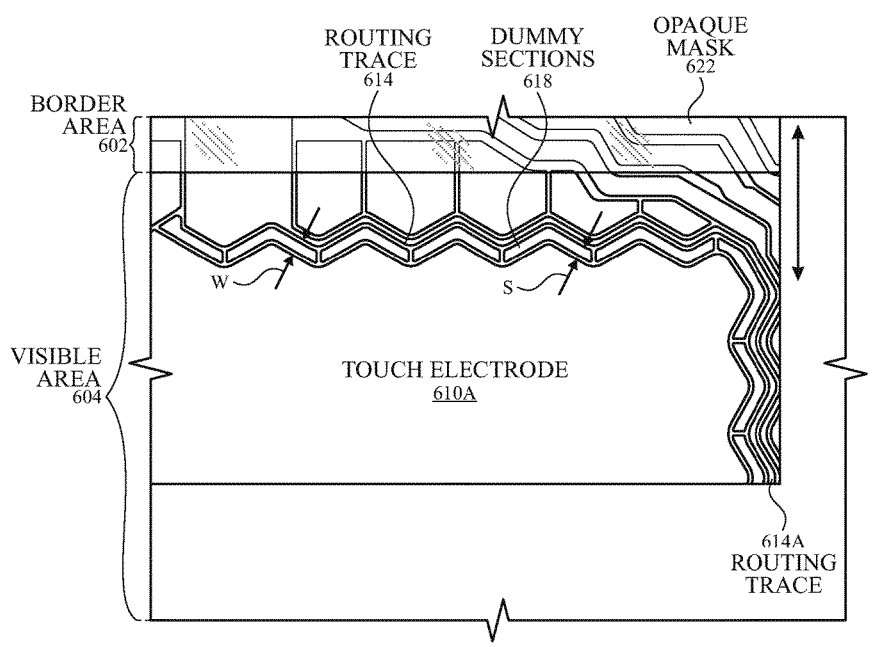
FIG. 6D illustrates a top view of a portion of an exemplary touch sensor panel including dummy sections located between touch electrodes and bond pads according to examples of the disclosure.

In some examples, one or more dummy sections 618 can be included between routing trace 614a and touch electrode 610a to prevent or reduce the risk of self-arcing between routing trace 614a and touch electrode 610a. Additionally or alternatively, one or more dummy sections can be located between trace arm 614c and touch electrode 610a. The width W of the plurality of dummy sections, the spacing S between touch electrode 610a and dummy sections 618, and/or the spacing S between routing trace 614a and dummy section 618 can be configured to avoid arcing. In some examples, the width W and spacing S can be configured such that the distance between touch electrode 610a and routing trace 614a is greater than or equal to 2*S+W. Examples of the disclosure can include one or more dummy sections 618 located between touch electrode 610a and bond pads 620, as illustrated in FIG. 6D.

Figure 6E:
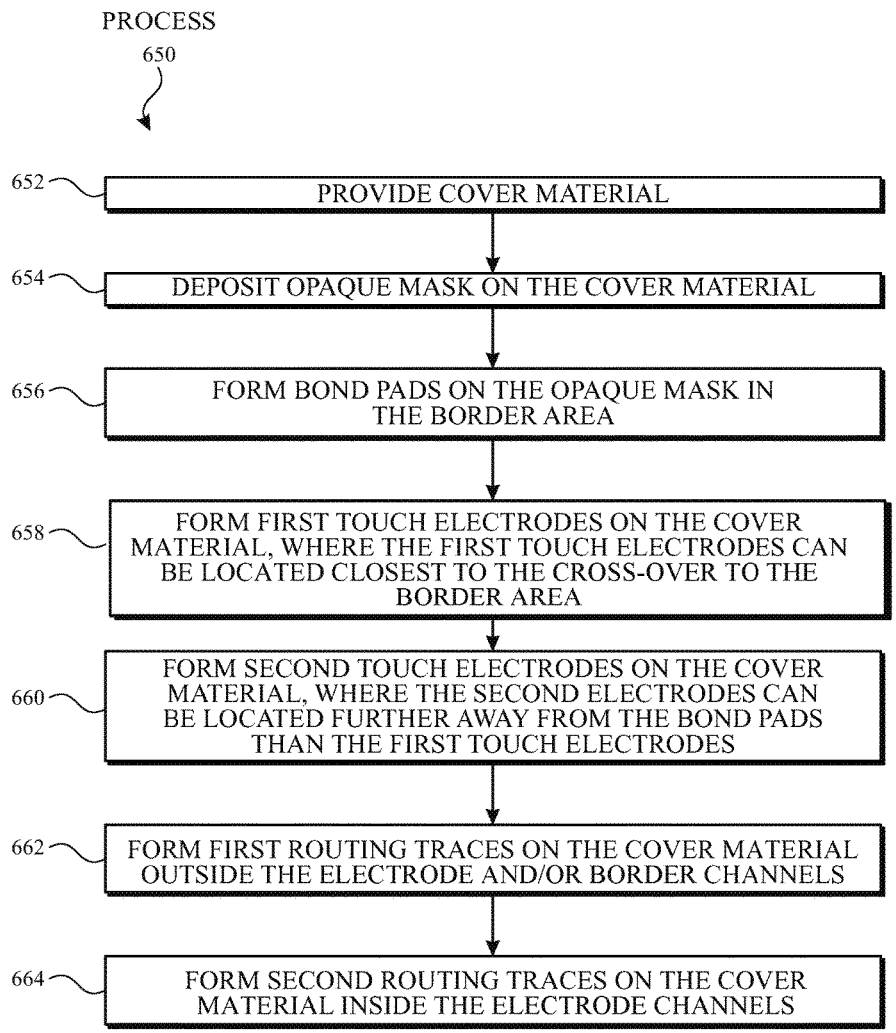
FIG. 6E illustrates a method for forming an exemplary touch sensor panel including serpentine routing according to examples of the disclosure.

FIG. 6E illustrates a method for forming an exemplary touch sensor panel including serpentine routing according to examples of the disclosure. A cover material (e.g. cover material 232 illustrated in FIG. 2B) can be provided (step 652 of process 650). An opaque mask (e.g., opaque mask 622 illustrated in FIG. 3B) can be deposited on the cover material (step 654 of process 650). Bond pads (e.g., bond pads 620 illustrated in FIG. 6A) can optionally be formed on the opaque mask in the border area (e.g., border area 602 illustrated in FIGS. 6A-6B) (step 656 of process 650). First touch electrodes (e.g., touch electrodes 610a illustrated in FIGS. 6A-6B) can be formed on the cover material in the visible area (e.g., visible area 604 illustrated in FIG. 6A), where the first touch electrodes can be located closest to the cross-over to the border area (e.g., closest to the bond pads) (step 658 of process 650). Second touch electrodes (e.g., touch electrodes 610b illustrated in FIGS. 6A-6B) can be formed on the cover material in the visible area, where the second touch electrodes can be located further away from the bond pads from first touch electrodes (step 660 of process 650). Optionally, the second touch electrodes can be larger than the first touch electrodes. First routing traces (e.g., routing traces 614a and/or routing traces 614c illustrated in FIG. 6B) can be formed on the cover material outside the electrode and/or border channels (step 662 of process 650). Second routing traces (e.g., routing traces 614b illustrated in FIG. 6C) can be formed on the cover material inside the electrode channels (step 664 of process 650). In some examples, forming the bond pads, first and second touch electrodes, and/or first and second routing traces can be performed in the same step. Although FIGS. 6A-6E illustrate and are discussed in the context of a visible area, examples of the disclosure can include serpentine located in the active area of the touch sensor panel.

Figure 7:
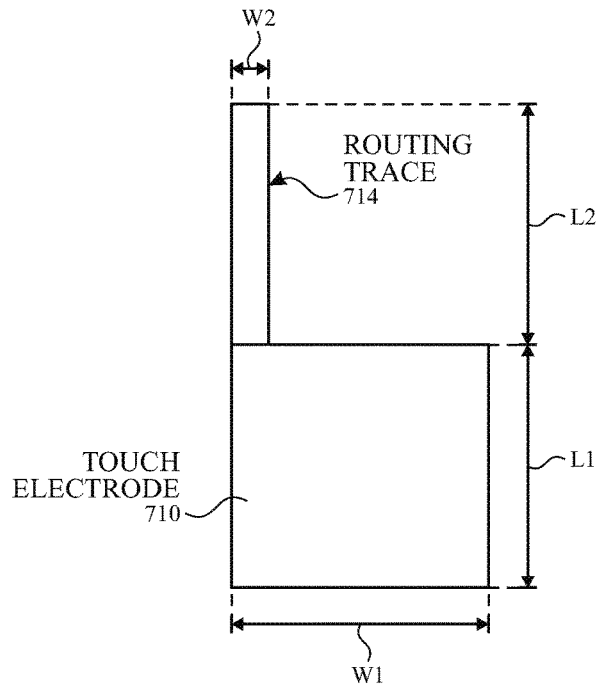
FIG. 7 illustrates a top view of an exemplary touch electrode and associated routing trace according to examples of the disclosure.

Examples of the disclosure can include avoiding joule heating by minimizing any large differences between the width of the touch electrodes and routing traces. FIG. 7 illustrates a top view of an exemplary touch electrode and associated routing trace according to examples of the disclosure. Touch electrode 710 can be electrically coupled to routing trace 714. Touch electrode 710 can have a width W1 and length L1, and routing trace can have a width W2 and L2. To prevent or reduce the risk of joule heating, bottleneck areas can be minimized by increasing the ratio of the width of the routing trace to the width of the touch electrode (i.e., W2/W1).

Figure 8A:
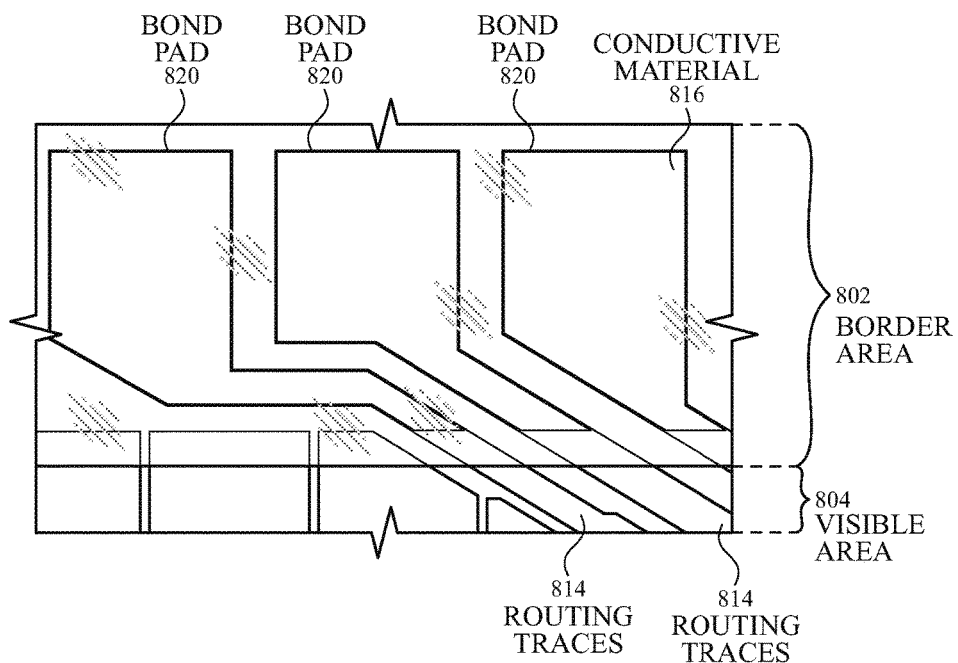
FIGS. 8A-8B illustrate top and cross-sectional views of at least a portion of the bond pads and routing traces in the border area according to examples of the disclosure.
Figure 8B:
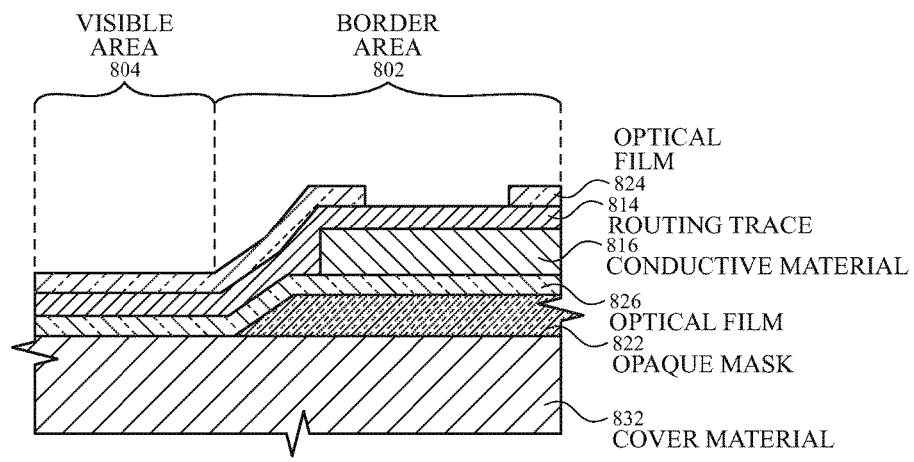

In some examples, the resistance can be decreased by modifying the stackup in the border areas to include thicker conductive material. FIGS. 8A-8B illustrate top and cross-sectional views of at least a portion of the bond pads and routing traces in the border area according to examples of the disclosure. The stackup of bond pads 820 in border area 802 can include routing trace 814 disposed on conductive material 816. In some examples, routing trace 814 and conductive material 816 can include the same material. Optionally, the stackup can further include optical film 824, optical film 826, and dielectric layer 828. The stackup can further include opaque mask 822 and substrate 802. Routing trace 814 and conductive material 816 can be directly contacting each other and can be located between cover material 832 and optical film 824, for example. In some examples, conductive material 816 can include a plurality of layers and/or can have one or more different electrical properties (e.g., resistance) than routing trace 814.

Figure 8C:
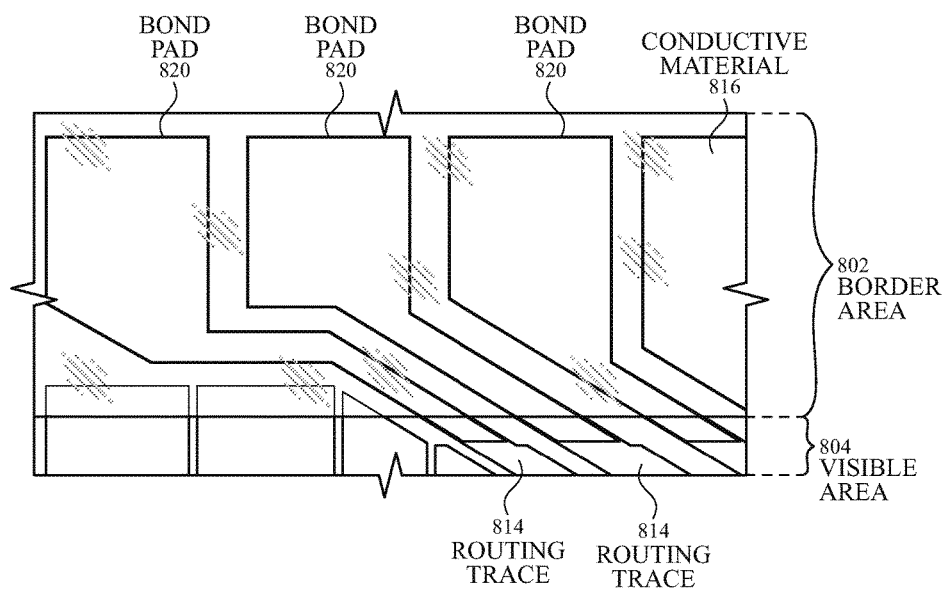
FIGS. 8C-8D illustrate top and cross-sectional views of thicker conductive material extending into the visible area of the touch sensor panel according to examples of the disclosure.
Figure 8D:
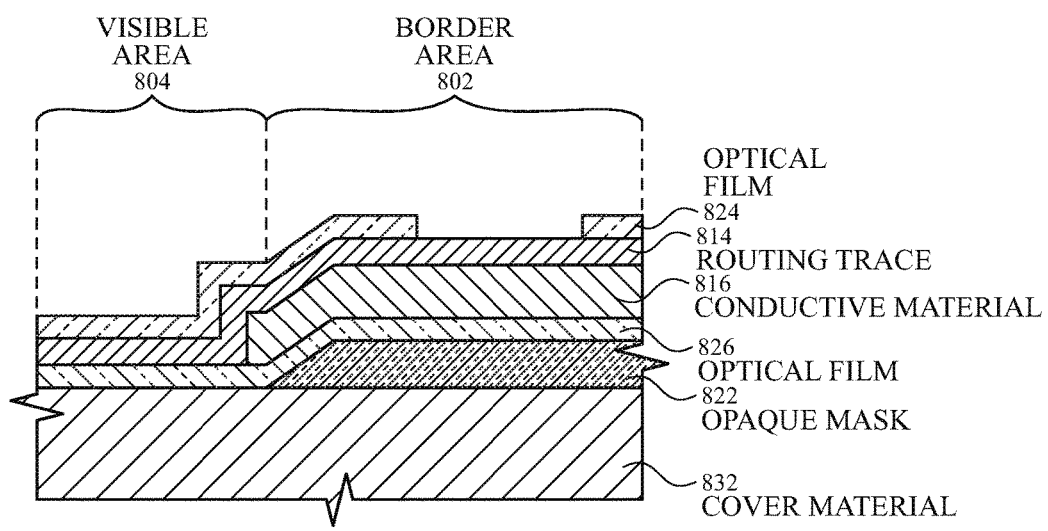

In some examples, at least a portion of conductive material 816 can extend into the visible area 804, as illustrated in FIGS. 8C-8D. In some examples, a portion of routing trace 814 can be disposed on conductive material 816, as illustrated in FIG. 8E. The thickness of conductive layer 814 can be greater than the thickness of routing trace 814, for example.

Figure 9:
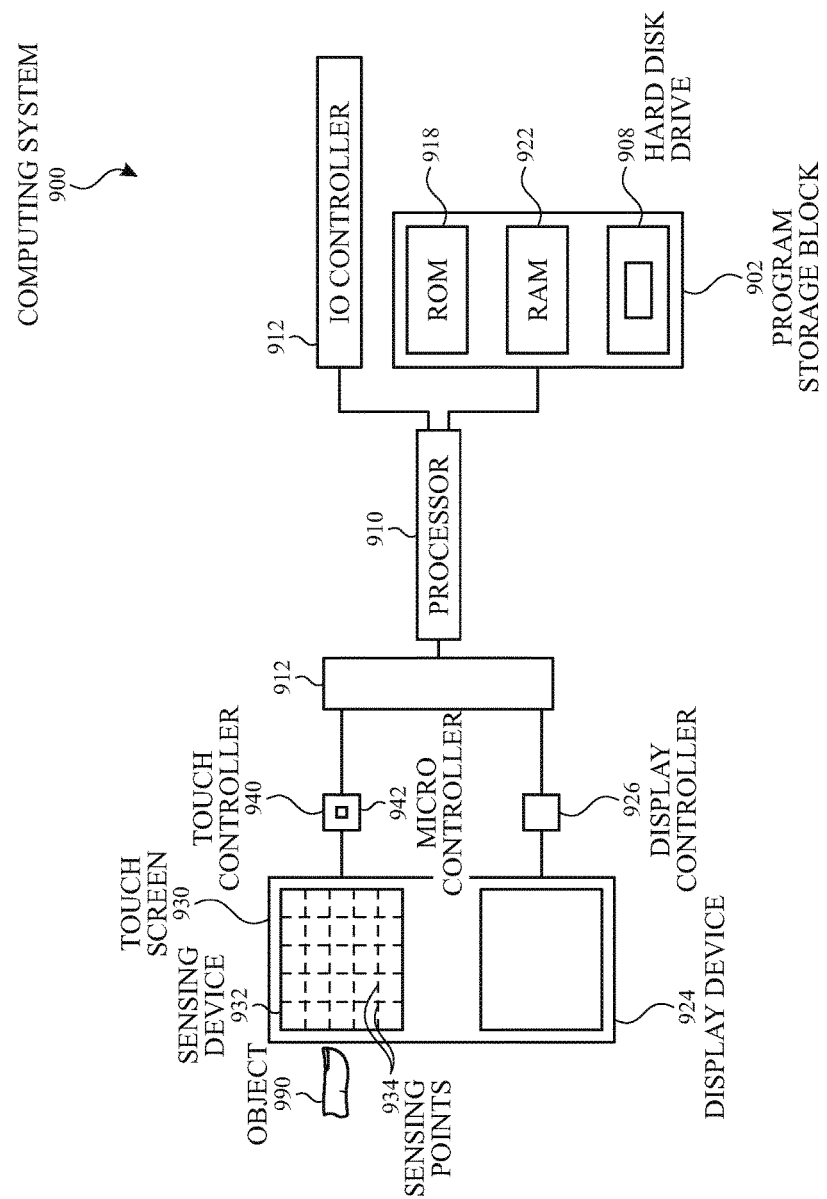
FIG. 9 illustrates an exemplary block diagram of a computing system according to examples of the disclosure.

FIG. 9 illustrates an exemplary block diagram of a computing system comprising touch sensor configurations according to examples of the disclosure. Computing system 900 can correspond to any of the computing devices illustrated in FIGS. 1A-1C. Computing system 900 can include a processor 910 configured to execute instructions and to carry out operations associated with computing system 900. For example, using instructions retrieved from memory, processor 910 can control the reception and manipulation of input and output data between components of computing system 900. Processor 910 can be a single-chip processor or can be implemented with multiple components.

In some examples, processor 910 together with an operating system can operate to execute computer code and produce and use data. The computer code and data can reside within a program storage block 902 that can be operatively coupled to processor 910. Program storage block 902 can generally provide a place to hold data that is being used by computing system 900. Program storage block 902 can be any non-transitory computer-readable storage medium, and can store, for example, history and/or pattern data relating to PPG signal and perfusion index values measured by one or more light sensors such as light sensor 904. By way of example, program storage block 902 can include Read-Only Memory (ROM) 918, Random-Access Memory (RAM) 922, hard disk drive 908 and/or the like. The computer code and data could also reside on a removable storage medium and loaded or installed onto the computing system 900 when needed. Removable storage mediums include, for example, CD-RM, DVD-ROM, Universal Serial Bus (USB), Secure Digital (SD), Compact Flash (CF), Memory Stick, Multi-Media Card (MMC) and a network component.

Computing system 900 can also include an input/output (I/O) controller 912 that can be operatively coupled to processor 910 or it may be a separate component as shown. I/O controller 912 can be configured to control interactions with one or more I/O devices. I/O controller 912 can operate by exchanging data between processor 910 and the I/O devices that desire to communicate with processor 910. The I/O devices and I/O controller 912 can communicate through a data link. The data link can be a one-way link or a two way link. In some cases, I/O devices can be connected to I/O controller 912 through wireless connections. By way of example, a data link can correspond to PS/2, USB, Firewire, IR, RF, Bluetooth or the like.

Computing system 900 can include a display device 924 that can be operatively coupled to processor 910. Display device 924 can be a separate component (peripheral device) or can be integrated with processor 910 and program storage block 902 to form a desktop computer (all in one machine), a laptop, handheld or tablet computing device of the like. Display device 924 can be configured to display a graphical user interface (GUI) including perhaps a pointer or cursor as well as other information to the user. By way of example, display device 924 can be any type of display including a liquid crystal display (LCD), an electroluminescent display (ELD), a field emission display (FED), a light emitting diode display (LED), an organic light emitting diode display (OLED) or the like.

Display device 924 can be coupled to display controller 926 that can be coupled to processor 910. Processor 910 can send raw data to display controller 926, and display controller 926 can send signals to display device 924. Data can include voltage levels for a plurality of pixels in display device 924 to project an image. In some examples, processor 910 can be configured to process the raw data.

Computing system 900 can also include a touch screen 930 that can be operatively coupled to processor 910. Touch screen 930 can be a combination of sensing device 932 and display device 924, where the sensing device 932 can be a transparent panel that is positioned in front of display device 924 or integrated with display device 924. In some cases, touch screen 930 can recognize touches and the position and magnitude of touches on its surface. Touch screen 930 can report the touches to processor 910, and processor 910 can interpret the touches in accordance with its programming. For example, processor 910 can perform tap and event gesture parsing and can initiate a wake of the device or powering on one or more components in accordance with a particular touch.

Touch screen 930 can be coupled to a touch controller 940 that can acquire data from touch screen 930 and can supply the acquired data to processor 910. In some cases, touch controller 940 can be configured to send raw data to processor 910, and processor 910 processes the raw data. For example, processor 910 can receive data from touch controller 940 and can determine how to interpret the data. The data can include the coordinates of a touch as well as pressure exerted. In some examples, touch controller 940 can be configured to process raw data itself. That is, touch controller 940 can read signals from sensing points 934 located on sensing device 932 and turn them into data that the processor 910 can understand.

Touch controller 940 can include one or more microcontrollers such as microcontroller 942, each of which can monitor one or more sensing points 934. Microcontroller 942 can, for example, correspond to an application specific integrated circuit (ASIC), which works with firmware to monitor the signals from sensing device 932, process the monitored signals, and report this information to processor 910.

One or both display controller 926 and touch controller 940 can perform filtering and/or conversion processes. Filtering processes can be implemented to reduce a busy data stream to prevent processor 910 from being overloaded with redundant or non-essential data. The conversion processes can be implemented to adjust the raw data before sending or reporting them to processor 910.

In some examples, sensing device 932 is based on capacitance. When two electrically conductive members come close to one another without actually touching, their electric fields can interact to form a capacitance. The first electrically conductive member can be one or more of the sensing points 934, and the second electrically conductive member can be an object 990 such as a finger. As object 990 approaches the surface of touch screen 930, a capacitance can form between object 990 and one or more sensing points 934 in close proximity to object 990. By detecting changes in capacitance at each of the sensing points 934 and noting the position of sensing points 934, touch controller 940 can recognize multiple objects, and determine the location, pressure, direction, speed and acceleration of object 990 as it moves across the touch screen 930. For example, touch controller 990 can determine whether the sensed touch is a finger, tap, or an object covering the surface.

Sensing device 932 can be based on self-capacitance or mutual capacitance. In self-capacitance, each of the sensing points 934 can be provided by an individually charged electrode. As object 990 approaches the surface of the touch screen 930, the object can capacitively couple to those electrodes in close proximity to object 990, thereby stealing charge away from the electrodes. The amount of charge in each of the electrodes can be measured by the touch controller 940 to determine the position of one or more objects when they touch or hover over the touch screen 930. In mutual capacitance, sensing device 932 can include a two-layer grid of spatially separated lines or wires, although other configurations are possible. The upper layer can include lines in rows, while the lower layer can include lines in columns (e.g., orthogonal). Sensing points 934 can be provided at the intersections of the rows and columns. During operation, the rows can be charged, and the charge can capacitively couple from the rows to the columns. As object 990 approaches the surface of the touch screen 930, object 990 can capacitively couple to the rows in close proximity to object 990, thereby reducing the charge coupling between the rows and columns. The amount of charge in each of the columns can be measured by touch controller 940 to determine the position of multiple objects when they touch the touch screen 930.

A touch sensor panel is disclosed. The touch sensor panel can comprise: an opaque mask located in a border area and contacting at least a portion of a conductive material; a plurality of touch electrodes configured to detect a touch, at least a portion of the plurality of touch electrodes located in a visible area of the touch sensor panel; a plurality of electrode channels defined by the plurality of touch electrodes, wherein each of the plurality of electrode channels includes a space between adjacent touch electrodes; a plurality of bond pads located in a border area of the touch sensor panel; a border channel located between at least one of the plurality of touch electrodes and at least one of the plurality of bond pads; and a plurality of routing traces, each routing trace configured to route one of the plurality of touch electrodes to one of the plurality of bond pads, a first portion of the routing trace is located in one of the plurality of electrode channels, a second portion of the routing trace is located in the border channel in the visible area, and a third portion of the routing trace is located in the border channel in the border area, wherein one or more of the width, thickness, and spacing to an adjacent routing trace of the first portion is less than the second portion, and one or more of the width, thickness, and spacing to the adjacent routing trace of the second portion is less than the third portion. Additionally or alternatively, in some examples, at least a portion of the plurality of routing traces located in the border area is formed of the conductive material. Additionally or alternatively, in some examples, the touch sensor panel further comprises: a plurality of conductive sections located exclusively in the border area of one or more sides of the touch sensor panel, each conductive section electrically coupled to one of the routing traces, wherein the routing trace is disposed only on a portion of the conductive section. Additionally or alternatively, in some examples, the plurality of conductive sections is located exclusively in the border area of all sides of the touch sensor panel.

A touch sensor panel is disclosed. In some examples, the touch sensor panel comprises: an opaque mask located in a border area and contacting at a least a portion of a conductive material; a plurality of touch electrodes configured to detect a touch, the plurality of touch electrodes located in a visible area of the touch sensor panel; and one or more dummy sections formed from the conductive material, each dummy section having a first portion located in the visible area and a second portion located in the border area. Additionally or alternatively, in some examples, the plurality of touch electrodes is located exclusively in the visible area along one or more sides of the touch sensor panel. Additionally or alternatively, in some examples, the plurality of touch electrodes is located exclusively in the visible area along all sides of the touch sensor panel. Additionally or alternatively, in some examples, the plurality of touch electrodes is formed from the conductive material. Additionally or alternatively, in some examples, the touch sensor panel further comprises: an overlap between an inner edge of the opaque mask and an outer edge of each of the plurality of dummy sections, wherein the overlap is greater than or equal to 1 microns. Additionally or alternatively, in some examples, some of the plurality of touch electrodes include a first portion located in the border area and a second portion located in the visible area, the touch sensor panel further comprising: a gap located between adjacent first portions, wherein one or more first dummy sections are included in the plurality of dummy sections, the one or more first dummy sections including a plurality of spatially separated sections of the conductive material located in the border area. Additionally or alternatively, in some examples, the touch sensor panel further comprises: a first overlap between an inner edge of the opaque mask and an outer edge of each of the plurality of dummy sections; and a second overlap between the inner edge of the opaque mask and an outer edge of each of the plurality of touch electrodes, wherein the second overlap can be greater than or equal to the first overlap. Additionally or alternatively, in some examples, the first and second overlaps are greater than or equal to 1 micron.

A touch sensor panel is disclosed. In some examples, the touch sensor panel can comprise: an opaque mask located in a border area and contacting at a least a portion of a conductive material; a plurality of bond pads located in a border area of the touch sensor panel; a plurality of touch electrodes configured to detect a touch, the plurality of touch electrodes located in a visible area of the touch sensor panel, the plurality of touch electrodes comprising: a plurality of first touch electrodes, and a plurality of second touch electrodes, the plurality of second touch electrodes located further from the plurality of bond pads than the plurality of first touch electrodes; a plurality of electrode channels defined by the plurality of touch electrodes, wherein each of the plurality of electrode channels includes a space between adjacent touch electrodes; and a plurality of routing traces, the plurality of routing traces comprising: a plurality of first routing traces, each first routing trace configured to electrically couple one of the plurality of first touch electrodes to one of the plurality of bond pads, and a plurality of second routing traces, each second routing trace configured to electrically couple one of the plurality of second touch electrodes to one of the plurality of bond pads, wherein for each first routing trace has the same resistance as each adjacent second routing trace. Additionally or alternatively, in some examples, each first touch electrode is smaller than each second touch electrode. Additionally or alternatively, in some examples, the plurality of second routing traces are routed inside at least one of the plurality of electrode channels, and each of the plurality of first routing traces is routed along at least two edges an electrically coupled first touch electrode and at least partially routed outside of the plurality of electrode channels. Additionally or alternatively, in some examples, the touch sensor panel further comprises:

one or more dummy sections located between at least one first touch electrode and at least one electrically coupled first routing trace. Additionally or alternatively, in some examples, each first touch electrode is electrically coupled to two first routing traces, wherein the two first routing traces are routed along three edges of the first touch electrode. Additionally or alternatively, in some examples, a length of each first routing trace is equal to a length of an adjacent second routing trace.

A method for forming a touch sensor panel is disclosed. The method comprises: providing a cover material; depositing an opaque mask on the cover material; depositing a conductive material on the cover material and the opaque mask; patterning the conductive material in a border area of the touch sensor panel to form a plurality of bond pads, a first portion of a plurality of routing traces, and a first portion of one or more dummy sections; and patterning the conductive material in a visible area of the touch sensor panel to form a plurality of touch electrodes, a second portion of the plurality of routing traces, and a second portion of the plurality of dummy sections. Additionally or alternatively, in some examples, patterning the conductive material in the visible area of the touch sensor panel includes forming a first portion of the touch electrodes, the method further comprising: patterning the conductive material in the border area of the touch sensor panel to form a second portion of the touch electrodes; and locating the first and second portions of the plurality of dummy sections between adjacent touch electrodes. Additionally or alternatively, in some examples, the method further comprises: locating at least two of the plurality of dummy sections between the adjacent touch electrodes. Additionally or alternatively, in some examples, the method further comprises: patterning the first portion of each of the plurality of dummy sections into spatially separated dummy sections.

Although examples have been fully described with reference to the accompanying drawings, it is to be noted that various changes and modifications will become apparent to those skilled in the art. Such changes and modifications are to be understood as being included within the scope of the various examples as defined by the appended claims.

The invention claimed is:

1. A touch sensor panel comprising:
an opaque mask located in a border area and contacting at least a portion of a conductive material;
a plurality of touch electrodes configured to detect a touch, at least a portion of the plurality of touch electrodes located in a visible area of the touch sensor panel;
a plurality of electrode channels defined by the plurality of touch electrodes, wherein each of the plurality of electrode channels includes a space between adjacent touch electrodes;
a plurality of bond pads located in a border area of the touch sensor panel;
a border channel located between at least one of the plurality of touch electrodes and at least one of the plurality of bond pads; and
a plurality of routing traces, each routing trace configured to route one of the plurality of touch electrodes to one of the plurality of bond pads,
a first portion of the routing trace is located in one of the plurality of electrode channels, a second portion of the routing trace is located in the border channel in the visible area, and a third portion of the routing trace is located in the border channel in the border area,
wherein one or more of the width, thickness, and spacing to an adjacent routing trace of the first portion is less than the second portion, and
one or more of the width, thickness, and spacing to the adjacent routing trace of the second portion is less than the third portion.

2. The touch sensor panel of claim 1, wherein at least a portion of the plurality of routing traces located in the border area is formed of the conductive material.

3. The touch sensor panel of claim 1, further comprising:
a plurality of conductive sections located exclusively in the border area of one or more sides of the touch sensor panel, each conductive section electrically coupled to one of the routing traces,
wherein the routing trace is disposed only on a portion of the conductive section.

4. The touch sensor panel of claim 3, wherein the plurality of conductive sections is located exclusively in the border area of all sides of the touch sensor panel.

5. A touch sensor panel comprising:
an opaque mask located in a border area and contacting at a least a portion of a conductive material;
a plurality of bond pads located in a border area of the touch sensor panel;
a plurality of touch electrodes configured to detect a touch, the plurality of touch electrodes located in a visible area of the touch sensor panel, the plurality of touch electrodes comprising:
a plurality of first touch electrodes, and
a plurality of second touch electrodes, the plurality of second touch electrodes located further from the plurality of bond pads than the plurality of first touch electrodes;
a plurality of electrode channels defined by the plurality of touch electrodes, wherein each of the plurality of electrode channels includes a space between adjacent touch electrodes; and
a plurality of routing traces, the plurality of routing traces comprising:
a plurality of first routing traces, each first routing trace configured to electrically couple one of the plurality of first touch electrodes to one of the plurality of bond pads, and
a plurality of second routing traces, each second routing trace configured to electrically couple one of the plurality of second touch electrodes to one of the plurality of bond pads,
wherein for each first routing trace has the same resistance as each adjacent second routing trace.

6. The touch sensor panel of claim 5, wherein each first touch electrode is smaller than each second touch electrode.

7. The touch sensor panel of claim 5, wherein the plurality of second routing traces is routed inside at least one of the plurality of electrode channels, and
each of the plurality of first routing traces is routed along at least two edges an electrically coupled first touch electrode and at least partially routed outside of the plurality of electrode channels.

8. The touch sensor panel of claim 5, further comprising:
one or more dummy sections located between at least one first touch electrode and at least one electrically coupled first routing trace.

9. The touch sensor panel of claim 5, wherein each first touch electrode is electrically coupled to two first routing traces, wherein the two first routing traces are routed along three edges of the first touch electrode.

10. The touch sensor panel of claim 5, wherein a length of each first routing trace is equal to a length of an adjacent second routing trace.

\* \* \* \* \*

UNITED STATES PATENT AND TRADEMARK OFFICE
CERTIFICATE OF CORRECTION

| | | |
|---|---|---|
| PATENT NO. | : 10,444,918 B2 | Page 1 of 1 |
| APPLICATION NO. | : 15/691283 | |
| DATED | : October 15, 2019 | |
| INVENTOR(S) | : Wencong Zhu et al. | |

It is certified that error appears in the above-identified patent and that said Letters Patent is hereby corrected as shown below:

In the Claims

In Column 18, Line 23, in Claim 5, before "least" delete "a".

Signed and Sealed this
Twenty-eighth Day of April, 2020

Andrei Iancu
*Director of the United States Patent and Trademark Office*